United States Patent
Nishibata et al.

[11] Patent Number: 5,978,584
[45] Date of Patent: Nov. 2, 1999

[54] DEBUGGING APPARATUS FOR DEBUGGING A PROGRAM BY CHANGING HARDWARE ENVIRONMENTS WITHOUT CHANGING PROGRAM OPERATION STATE

[75] Inventors: Motohide Nishibata, Kadoma; Yoshiyuki Iwamura, Hirakata; Fumio Sumi, Katano, all of Japan

[73] Assignee: Matsushita Electric Industrial Co., Ltd., Japan

[21] Appl. No.: 08/878,950

[22] Filed: Jun. 19, 1997

[30] Foreign Application Priority Data

Jun. 19, 1996 [JP] Japan .................................. 8-157841

[51] Int. Cl.[6] .................................................... G06F 9/455
[52] U.S. Cl. ................ 395/704; 395/500.44; 395/500.49
[58] Field of Search .............................. 395/500; 364/578

[56] References Cited

U.S. PATENT DOCUMENTS 5,768,567  6/1998  Klein et al. .............................. 395/500
5,838,948  11/1998  Bunza ..................................... 395/500
5,841,967  11/1998  Sample et al. ...................... 395/183.09

OTHER PUBLICATIONS

Borgatti et al, "A Smoothly Upgradable Approach to Virtual Emulation of HW/SW Systems," Proceedings of the Seventh IEEE International Workshop on Rapid System Prototyping, pp. 83–88, Jun. 1996.

Primary Examiner—Kevin J. Teska
Assistant Examiner—Samuel Broda
Attorney, Agent, or Firm—Price, Gess & Ubell

[57] ABSTRACT

A debugging apparatus is disclosed which verifies a program to be embedded into a target machine by running the program in an environment which is one or the target machine, an emulator, and a simulator. Each environment includes operation state information of the program and inputs and outputs the operation state information in a form unique to the environment. The debugging apparatus includes; target environment storing unit for storing an identification name of the target environment; receiving unit for receiving a command from an operator; instruction detecting unit for detecting a certain instruction in the command; specifying unit for, when the certain instruction is detected, specifying a target environment specified by the identification name as a source target environment and for specifying any of the rest of the environments as a destination target environment; reading unit for reading operation state information from the source target environment; converting unit for converting the operation state information into operation state information written in a form unique to the destination target environment; setting unit for setting the converted operation state information in the destination target environment; and operation resuming unit for resuming the operation of the program in the destination target environment.

23 Claims, 32 Drawing Sheets

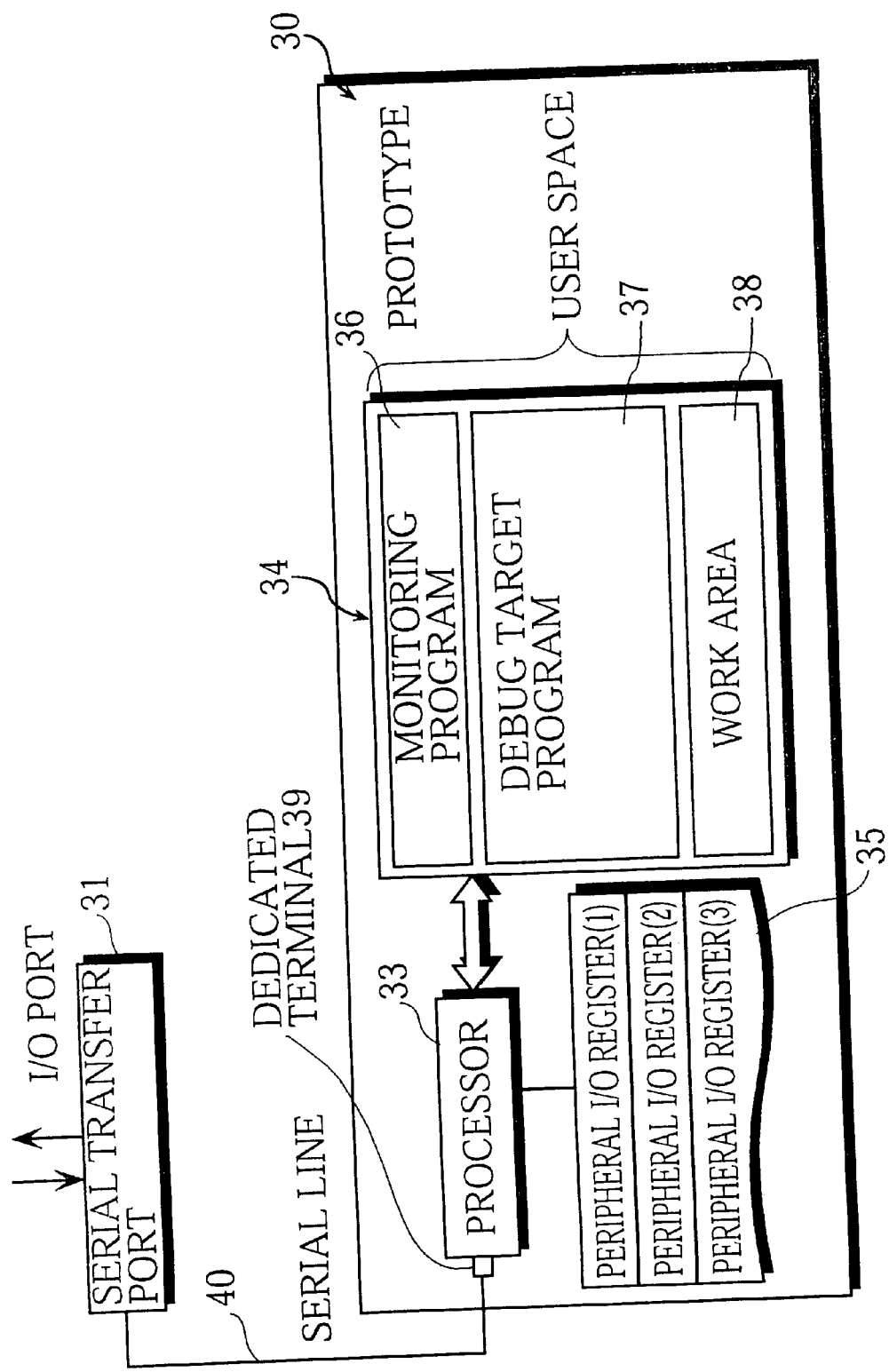

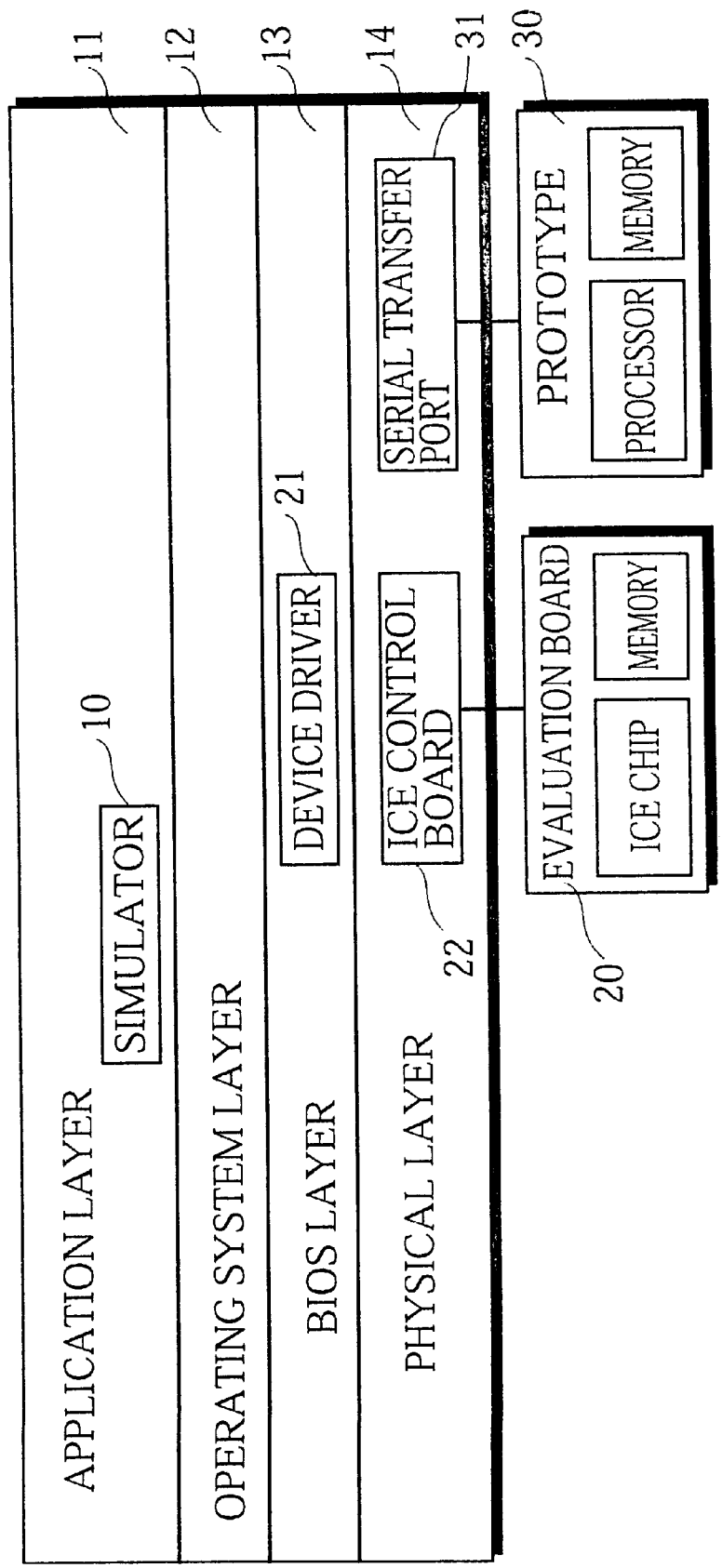

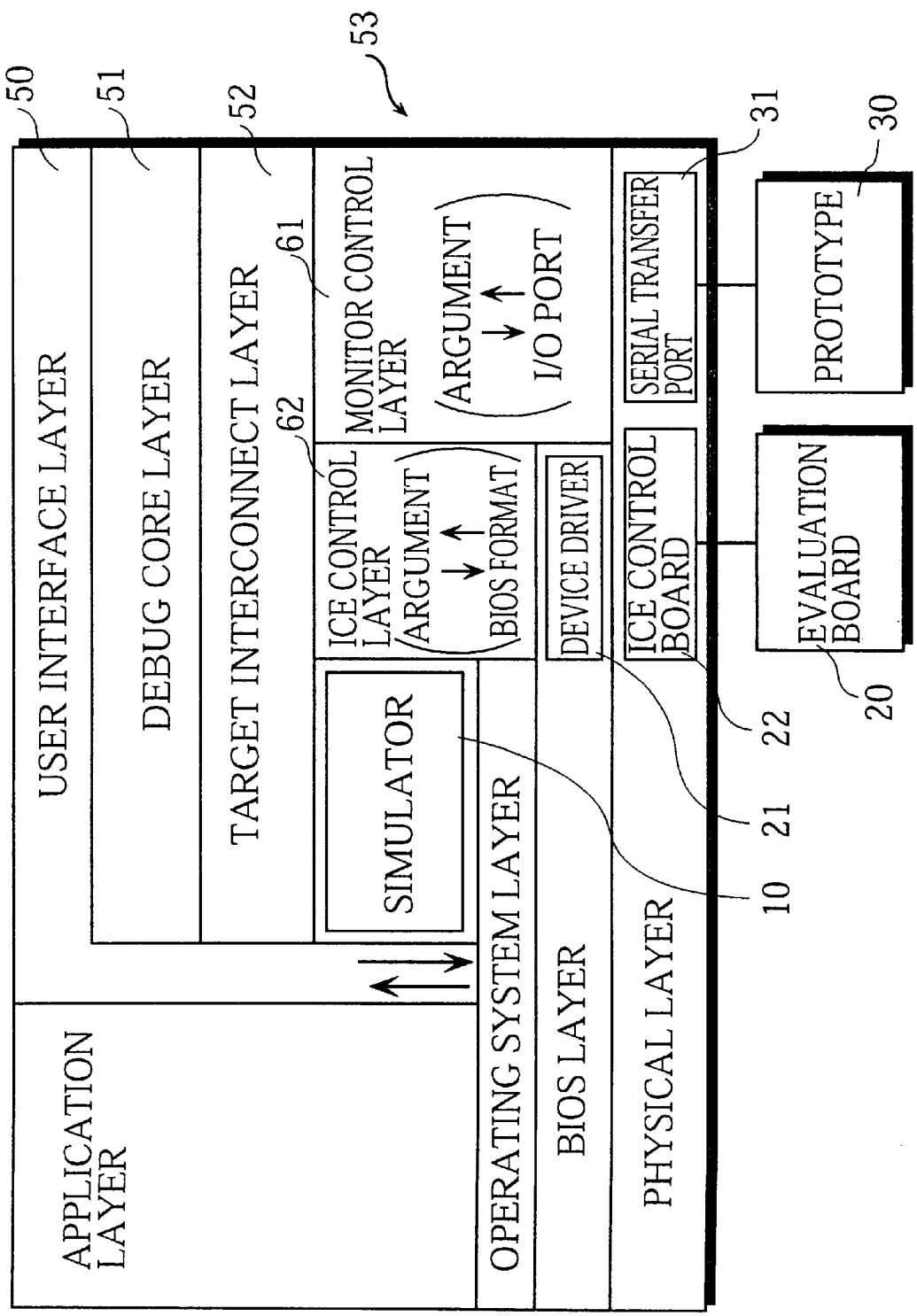

FIG. 6B

```
IFbreak (breakNo) {selectTARGET target}
            │
            targetASSIGN TABLE *
                    │
                    switch(var[target0])
                       case' * 1' : [target 1]
                       case' * 2' : [target 2]
```

FIG. 6C

| START ADDRESS 1 | END ADDRESS 1 | target 1 |
| START ADDRESS 2 | END ADDRESS 2 | target 2 |
| START ADDRESS 3 | END ADDRESS 3 | target 3 |
| ... | ... | ... |
| START ADDRESS n | END ADDRESS n | target n |

FIG. 7

```
* HARDWARE ENVIRONMENT IS SET TO TARGET1.    ←—P1
  TARGET1 IS MONITOR TYPE.

* INPUT COMMAND
  >readMEM  0x0100,16

* TARGET1 STORES FOLLOWING VALUE FOR 0x0100,16
  FF FF FF FF   FF FF FF FF   FF FF FF FF   FF FF FF FF

* INPUT COMMAND
  >writeREG  D1,03
  * VALUE 03 WAS STORED IN D1 OF TARGET1

* INPUT COMMAND
  >SetBP  BP1,0x0123
    * BREAKPOINT BP1 WAS SET AT 0x0123 OF TARGET1
* INPUT COMMAND
  >RUN
    * PROGRAM IS RUNNING UNDER TARGET1
    * PROGRAM STOPPED AT 0x0123 OF TARGET1

* INPUT COMMAND
  >SelectTARGET  TARGET2

* HARDWARE ENVIRONMENT CHANGES FROM TARGET1
    TO TARGET2
    TARGET1 IS MONITOR TYPE
    TARGET2 IS SIMULATOR TYPE
* WAIT UNTIL MEMORY DATA TRANSFER COMPLETES
* MEMORY DATA TRANSFER COMPLETED
* INPUT COMMAND
    >
```

FIG. 8

| SUB-COMMAND (BEFORE CONVERSION) | HIGH FUNCTION CALL CODE (AFTER CONVERSION) |
|---|---|
| copyMEM | TCI_get_mem(adr,length,unit,image)<br>TCI_set_mem(adr,length,unit,image) |
| copyReg | TCI_get_reg(regs,mask)<br>TCI_set_reg(regs,mask) |
| copyBP | TCI_get_BP(adr,length,unit,image)<br>TCI_set_BP(adr,length,unit,image) |
| copyINT | TCI_get_INT(cycle,intkind)<br>TCI_set_INT(cycle,intkind) |
| copyI/O | TCI_get_I/O(adr,length,unit,image)<br>TCI_set_I/O(adr,length,unit,image) |
| copyTRACE_DATA | TCI_get_TD(adr,length,unit,image)<br>TCI_set_TD(adr,length,unit,image) |

FIG. 9

SOURCE TARGET HARDWARE ENVIRONMENT=MONITOR
DESTINATION TARGET HARDWARE ENVIRONMENT=SIMULATOR
HIGH FUNCTION CALL CODE    LOW FUNCTION CALL CODE

TCI_get_mem(adr,length,unit,image)→MON_get_mem(adr,length,unit,image)

TCI_set_mem(adr,length,unit,image)→SIM_set_mem(adr,length,unit,image)

TCI_get_reg(regs,mask)→MON_get_reg(regs,mask)

TCI_set_reg(regs,mask)→SIM_set_reg(regs,mask)

TCI_get_BP(adr,length,unit,image)→MON_get_BP(adr,length,unit,image)

TCI_set_BP(adr,length,unit,image)→SIM_set_BP(adr,length,unit,image)

TCI_get_INT(cycle,int,kind)→MON_get_INT(cycle,int,kind)

TCI_set_INT(cycle,int,kind)→SIM_set_INT(cycle,int,kind)

TCI_get_I/O(adr,length,unit,image)→MON_get_I/O(adr,length,unit,image)

TCI_set_I/O(adr,length,unit,image)→SIM_set_I/O(adr,length,unit,image)

TCI_get_TD(adr,length,unit,image)→MON_get_TD(adr,length,unit,image)

TCI_set_TD(adr,length,unit,image)→SIM_set_TD(adr,length,unit,image)

FIG. 10A

COMMUNICATION SEQUENCE FOR
FUNCTION CALL CODE
MON_get_mem(adr,length,unit,image)

(1) MONITOR CONTROL LAYER→MONITOR PROGRAM   MEMREAD
    MONITOR CONTROL LAYER←MONITOR PROGRAM   ACK
    MONITOR CONTROL LAYER←MONITOR PROGRAM   DATA1
    ·
    ·
    ·
    MONITOR CONTROL LAYER←MONITOR PROGRAM   DATAN (2) TRANSMISSION PACKET(MONITOR CONTROL LAYER→MONITOR PROGRAM)

```
         0   1   2   3   4   5   6   7
       ┌───┬───┬───┬───────┬───────────┐
MEMREAD│CMD│UIT│SIZE│      ADRS       │
       └───┴───┴───┴───────┴───────────┘
```

RECEPTION PACKET(MONITOR CONTROL LAYER←MONITOR PROGRAM)

```
       0   1   2   3   4   5   6   7
     ┌───┬───────────────────────────┐
ACK  │ERR│           NUL             │
     └───┴───────────────────────────┘

0   1   2   3   4   5   6   7
     ┌───────────────────────────────┐ ⎫
DATA1/n│          DATA              │ ⎪
     └───────────────────────────────┘ ⎪  STORED IN AREA OF
           · · ·                        ⎬ WORK AREA SPECIFIED
       0   1   2   3   4   5   6   7   ⎪  BY "image"
     ┌───────────────────────────────┐ ⎪
DATAN/n│          DATA              │ ⎪
     └───────────────────────────────┘ ⎭
```

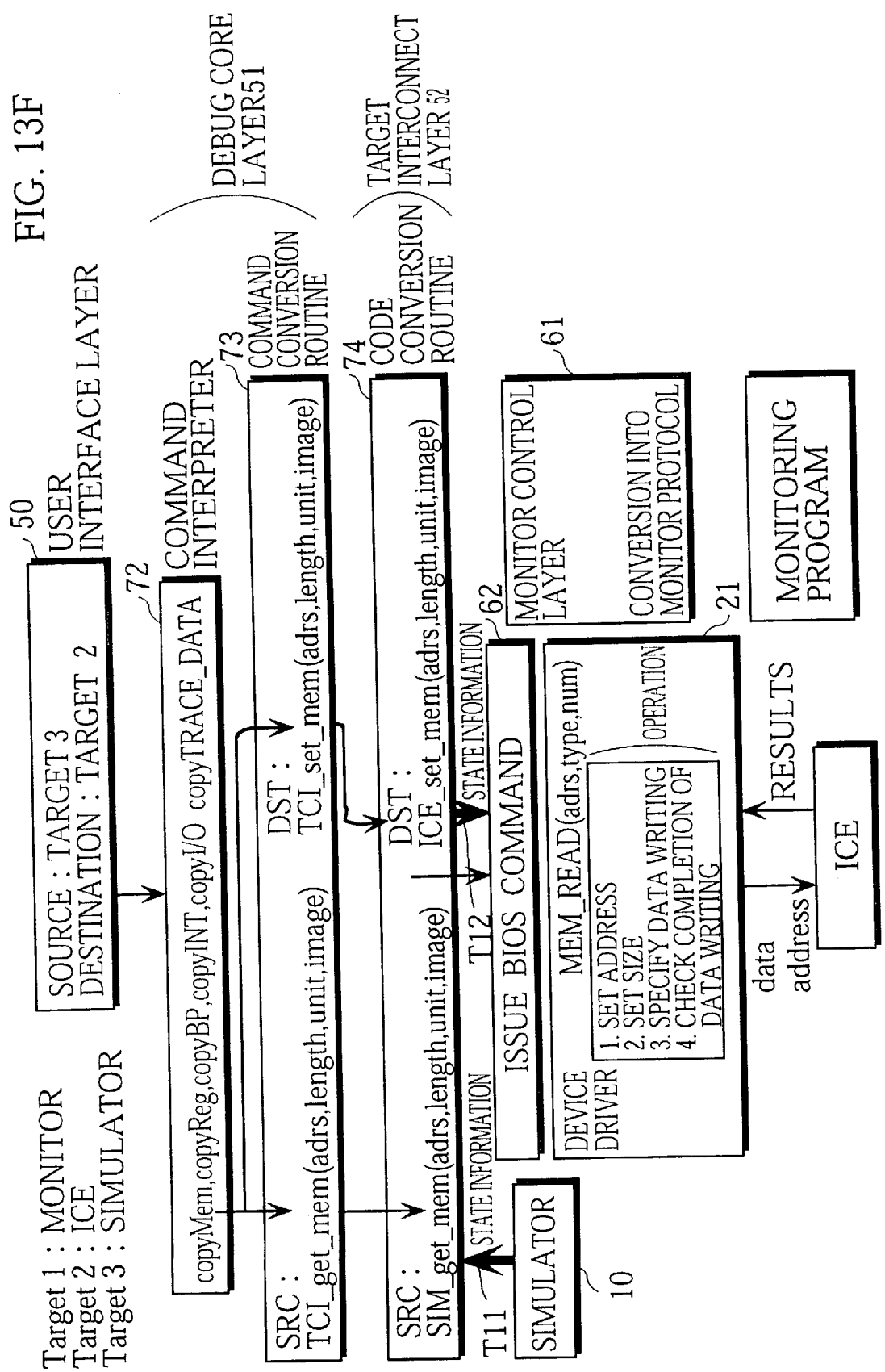

FIG. 14A

/＊BREAKPOINT ADDRESS＊/

```
BREAK_POINT [1] = 0x0020
BREAK_POINT [2] = 0x0250
BREAK_POINT [3] = 0x0300
BREAK_POINT [4] = 0x0350
BREAK_POINT [5] = 0x0510
BREAK_POINT [6] = 0x0530
```

FIG. 14B

/＊INTERRUPT SIGNAL GENERATION CONDITION＊/

```
CONDITION [1] = 20cycle, Int3
CONDITION [2] = 150cycle, Int5
CONDITION [3] = 230cycle, Int6
CONDITION [4] = 250cycle, Int7
CONDITION [5] = 300cycle, Int8
```

FIG. 14C

/＊TRACE DATA＊/

```
target1
    VALID_AREA1      START_ADDR1  ~  END_ADDR1
    VALID_AREA2      START_ADDR2  ~  END_ADDR2
    VALID_AREA3      START_ADDR3  ~  END_ADDR3
    VALID_AREA4      START_ADDR4  ~  END_ADDR4
target2
    VALID_AREA1      START_ADDR1  ~  END_ADDR1
    VALID_AREA3      START_ADDR3  ~  END_ADDR3
    VALID_AREA5      START_ADDR5  ~  END_ADDR5
    VALID_AREA6      START_ADDR6  ~  END_ADDR6
target3
    VALID_AREA2      START_ADDR2  ~  END_ADDR2
    VALID_AREA4      START_ADDR4  ~  END_ADDR4
    VALID_AREA5      START_ADDR5  ~  END_ADDR5
    VALID_AREA7      START_ADDR7  ~  END_ADDR7
```

FIG. 14E

```
target1
    SPACE_FOR_TRACE_DATA      MAX    16Kbyte target2
    SPACE_FOR_TRACE_DATA      MAX    1Kbyte target3
    SPACE_FOR_TRACE_DATA      MAX    32Kbyte
```

FIG. 14F

```
target1
    CYCLE_NUMBER_COUNT        INVALID target2
    CYCLE_NUMBER_COUNT        VALID target3
    CYCLE_NUMBER_COUNT        VALID
```

FIG. 14G

```
target1
    I/O_REGISTER_ADDR1    PSW=STATUS1    0x1F
                          PSW=STATUS2    0x2A
                          PSW=STATUS3    0x3B
    I/O_REGISTER_ADDR2    PSW=STATUS1    0x41
                          PSW=STATUS2    0x51
                          PSW=STATUS3    0x56
    I/O_REGISTER_ADDR3    PSW=STATUS1    0x18
                          PSW=STATUS2    0x22
                          PSW=STATUS3    0x24
target2
    I/O_REGISTER_ADDR1    PSW=STATUS1    0x33
                          PSW=STATUS2    0x32
                          PSW=STATUS3    0x41
    I/O_REGISTER_ADDR2    PSW=STATUS1    0x54
                          PSW=STATUS2    0x56
                          PSW=STATUS3    0x58
    I/O_REGISTER_ADDR3    PSW=STATUS1    0xA1
                          PSW=STATUS2    0x98
                          PSW=STATUS3    0x75
target3
    I/O_REGISTER_ADDR1    PSW=STATUS1    0x18
                          PSW=STATUS2    0x12
                          PSW=STATUS3    0x33
    I/O_REGISTER_ADDR2    PSW=STATUS1    0x42
                          PSW=STATUS2    0x52
                          PSW=STATUS3    0xB2
    I/O_REGISTER_ADDR3    PSW=STATUS1    0x31
                          PSW=STATUS2    0x54
                          PSW=STATUS3    0x52
```

DEBUGGING APPARATUS FOR DEBUGGING A PROGRAM BY CHANGING HARDWARE ENVIRONMENTS WITHOUT CHANGING PROGRAM OPERATION STATE

BACKGROUND OF THE INVENTION (1) Field of the Invention

This invention relates to a debugging apparatus, and more specifically, to a debugging apparatus for debugging a debug target program by changing hardware environments without changing program operation state.

(2) Description of the Prior Art

Microcomputer systems are indispensable to electrical appliances today. In developing programs for such microcomputer system, debugging is very important since microcomputer systems require such a quality as enduring mass production.

For debugging programs, the debug target programs are run in hardware environments to find errors (bugs). The bugs found are deleted from the programs.

The hardware environments in which debug target programs run are classified as follows:

(1) target machine prototypes;

(2) evaluation boards; and (3) simulators on host computers.

The hardware environment of (1) above is called "monitor type." In the monitor type hardware environment, operations of prototype microprocessors are monitored and simple debugging is performed.

The hardware environment of (2) above enables a high-quality debugging, using an in-circuit emulators (ICE) and various debugging tools. This hardware environment is called "ICE type."

The hardware environment of (3) above is called "simulator type." The simulators used in the environment are divided into two types: instruction level software simulators and logic level software simulators. Instruction level software simulators are such software systems as realizing, in a host computer, pseudo operation states of microprocessors by executing instructions of the microprocessors in the host computer.

The logic level software simulators simulate hardware operations and are generally used for designing microprocessor chips.

Meanwhile, these three types of hardware environments have their limitations respectively in the ability of testing operations.

In the ICE type hardware environment, the trace function can be used to output history of program operations. In the monitor type hardware environment, in contrast, it is difficult to use the trace function since it requires a great amount of memory capacity. Therefore, the operator is obliged to analyze the cause of bugs with other less-quality functions in the monitor type. It may be said that the program verification in the monitor type is insufficient since various cases such as multiple interrupts, interrupts at an appointed time, etc cannot be applied to the debug target program. On the other hand, modifying the hardware monitor machine is not realistic.

The limitations of the ICE type hardware environment derive from the difference in the circuit structure between the evaluation board and the target microprocessor. Even if the microprocessor appears to operate perfectly on the evaluation board, it is not enough to permit the shipping of the microprocessor. The microprocessor should be verified with its peripherals. Lines in the evaluation board, for example, may longer than those of a prototype microprocessor. This may generate a time lag when using the peripherals, which results in incorrectness of the microprocessor verification.

The limitation of the simulator type hardware environment derives from the slowness of operations. This is because the simulator itself uses the host computer. A process which takes one second in the ICE type or monitor type hardware environment, for example, takes several minutes or tens of several minutes in the simulator type hardware environment.

When an error occurs in a certain situation in a hardware environment, the operator may desire to reproduce the same situation in another hardware environment. Reproducing of such situations, however, generally requires a lot of trials and errors before the reproduction succeeds, such as transferring values at the time when an error occurred to the other environment, or running the debug target program from the beginning, etc. Such trials and errors takes a lot of time in the development of the microprocessor.

SUMMARY OF THE INVENTION

It is therefore an object of the present invention to provide a debugging apparatus which makes the most of the advantage of each of different hardware environments by controlling the hardware environments.

It is another object of the present invention to provide a debugging apparatus for, when an error occurs in a certain situation in a hardware environment, reproducing the same situation in another hardware environment, without causing the developer to perform a lot of trials and errors.

The above objects are achieved by a debugging apparatus for verifying a program, which is to be embedded into a target machine, by running the program in any of the target machine itself, an emulator machine emulating the target machine, and a simulator simulating the target machine in terms of software, where each of the target machine, the emulator machine, and the simulator includes operation state information which indicates an operation state of the program and inputs and outputs the operation state information in a form unique to each of the target machine, the emulator machine, and the simulator, the debugging apparatus including: target environment storing unit for storing information of a target environment which is an identification name of any of the target machine, the emulator machine, and the simulator as an environment target; receiving unit for receiving a command input by an operator; instruction detecting unit for judging whether a certain instruction is included in the command received by the receiving unit; specifying unit for, when the instruction detecting unit judges that the certain instruction is included in the command, specifying a target environment specified by the identification name stored in the target environment storing unit as a source target environment and for specifying, as a destination target environment, one of the target machine, the emulator machine, and the simulator other than the identification name stored in the target environment storing unit; reading unit for reading operation state information from the source target environment; converting unit for converting the operation state information read by the reading unit into operation state information written in a form unique to the destination target environment; setting unit for setting the operation state information written in the form unique to the destination target environment in the destination target environment; and operation resuming unit for resuming an operation of the program in the destination target environment.

With such a construction, the debugging apparatus enables the operator to switch the hardware environments in debugging the debug target program. That means the operator can effectively debug the debug target program, making the most of the advantage of each of different hardware environments.

The first part of a debug target program, for example, may be run in the prototype hardware environment. Then, the rest of the debug target program may be run in the simulator type hardware environment. This is because the simulator type takes a lot of time in running the program, though it has a lot of functions for analyzing the cause of bugs. This tactic is very effective when to find such a bug as occurring once in several tens or several hundreds of executions of the debug target program. This decreases the time of debugging.

Another advantageous aspect of the present invention is that the hardware environments are switched by an issue of a command, which is a handy method and may be possible in any situations in the execution of debugging. That means the operator can analyze the cause of the bug without taking much time for the development.

The debug target program also need not be run from the beginning in another hardware environment to reproduce the same situation for an error, while in conventional systems, values are transferred to the other hardware environment and the program is repeated from the beginning. This also decreases the time of debugging, and accordingly the time of developing.

The above debugging apparatus may further include: breakpoint setting managing unit for managing areas of the memories and the registers of the target machine, the emulator machine, and the simulator by classifying the areas into areas for which a breakpoint can be set and areas for which a breakpoint cannot be set; judging unit for judging whether a breakpoint is to be set in the destination target environment by referring to the breakpoint setting managing unit after the converting unit has converted the operation state information into the form of the destination target environment; and notifying unit for notifying the operator that the breakpoint is not to be set in the destination target environment when the judging unit judges that the breakpoint is not to be set in the destination target environment.

With such a construction it is possible for the debugging apparatus to inform the operator that a part of breakpoints cannot be set in the destination target hardware environment.

The above debugging apparatus may further comprise: maximum value storing unit for storing a value representing the maximum number of accumulated addresses for each of the target machine, the emulator machine, and the simulator; address number recognizing unit for recognizing a current number of accumulated addresses in the destination target environment; and notifying unit for notifying the operator of a difference between the current number of accumulated addresses and the maximum number of accumulated addresses.

With such a construction, it is possible for the debugging apparatus to inform the operator that a part of trace data accumulated in the source target hardware environment is lost in the destination target hardware environment.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2A shows the hardware construction of the monitor type hardware environment;

FIG. 3 shows internal layers of the debugging apparatus;

FIG. 4 shows the sub-layers in application layer 11;

FIG. 6B shows three major examples of the extended selectTARGET commands;

FIG. 6C shows a table which shows destination target hardware environments;

FIG. 7 shows messages output onto display 2 by user interface layer 50;

FIG. 8 shows the sub-commando and the corresponding function call codes;

FIG. 9 shows the high function call codes and corresponding low function call codes;

FIG. 10A shows the control of reading data from work area 38 in prototype 30 by monitor control layer 61;

FIG. 13F shows the transportation of state information when the selectTARGET command specifying the ICE type is input while the program runs in the simulator type hardware environment;

FIG. 14A shows breakpoint addresses;

FIG. 14B shows an interrupt signal generation condition;

FIG. 14C shows the trace data;

FIG. 14D shows information used for the breakpoint management function;

FIG. 14E shows information used for the trace data accumulation size management function;

FIG. 14F shows information used for the interrupt generation condition management function;

FIG. 14G shows I/O mapping information used for the I/O mapping information management function;

DESCRIPTION OF THE PREFERRED EMBODIMENTS

Figure 1A:
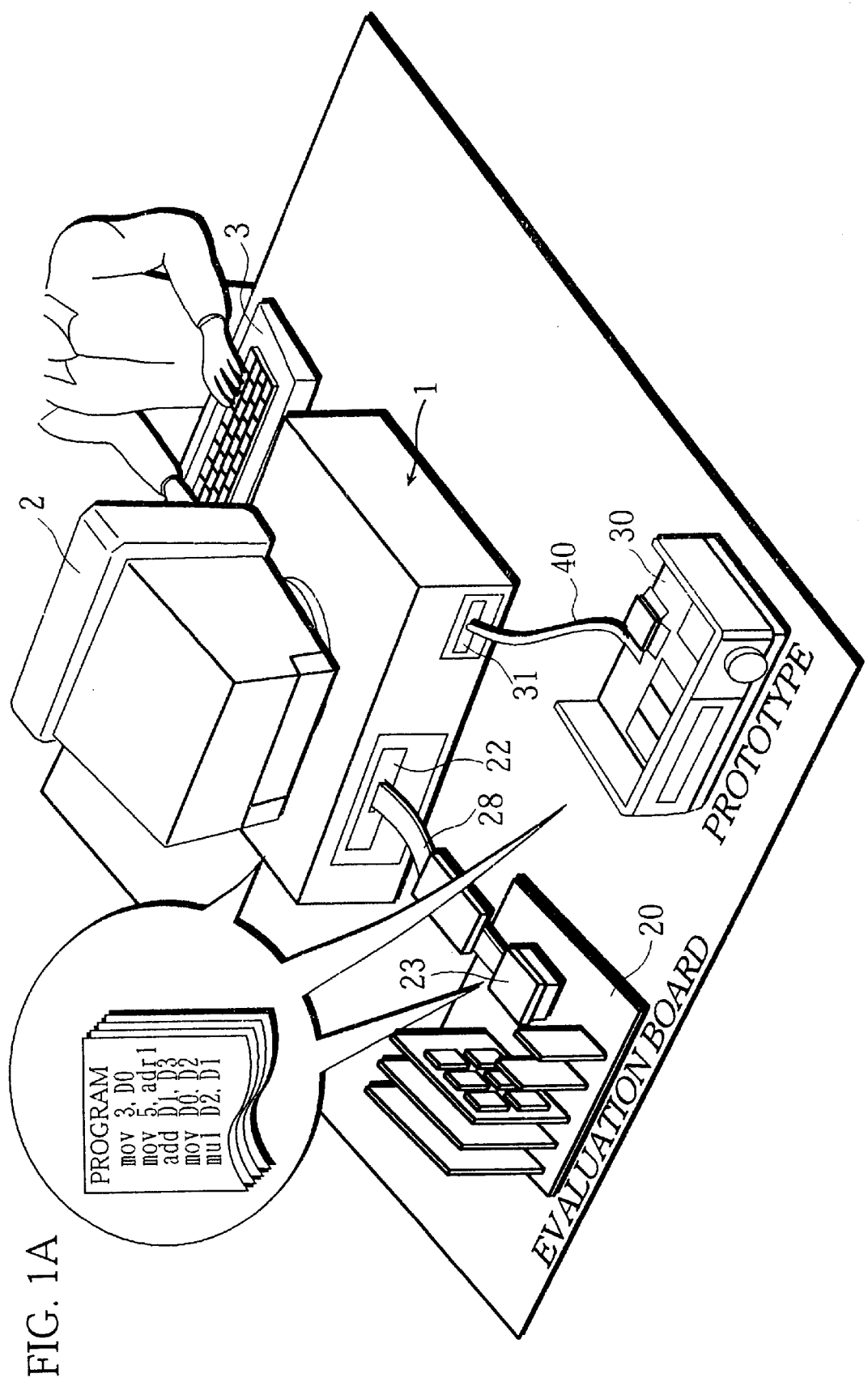
FIG. 1A shows an appearance of the debugging apparatus of the present embodiment.

The debugging apparatus of the present invention is composed of host computer 1, which is a general-purpose computer, connected to ICE control board 22 and serial transfer port 31. FIG. 1A shows an appearance of the debugging apparatus of the present invention.

Prototype 30 of an electrical appliance is called the monitor type hardware environment. Prototype 30 includes a ROM which stores a debug target program. The debug target program of prototype 30 is under control of host computer 1. The start and end of the operation of the debug target program are performed with instructions from the host computer sent via serial line 40. Host computer 1 reads data from storages of prototype 30, such as memories and registers. The read data is also dealt with as the state information.

Evaluation board 20 also runs the debug target program. The debug target program of evaluation board 20 is also under control of host computer 1. The start and end of the operation of the debug target program are performed with instructions from the host computer sent via parallel line 28. Host computer 1 reads data from storages of evaluation board 20, such as memories and registers. The read data is also dealt with as the state information.

Figure 1B:
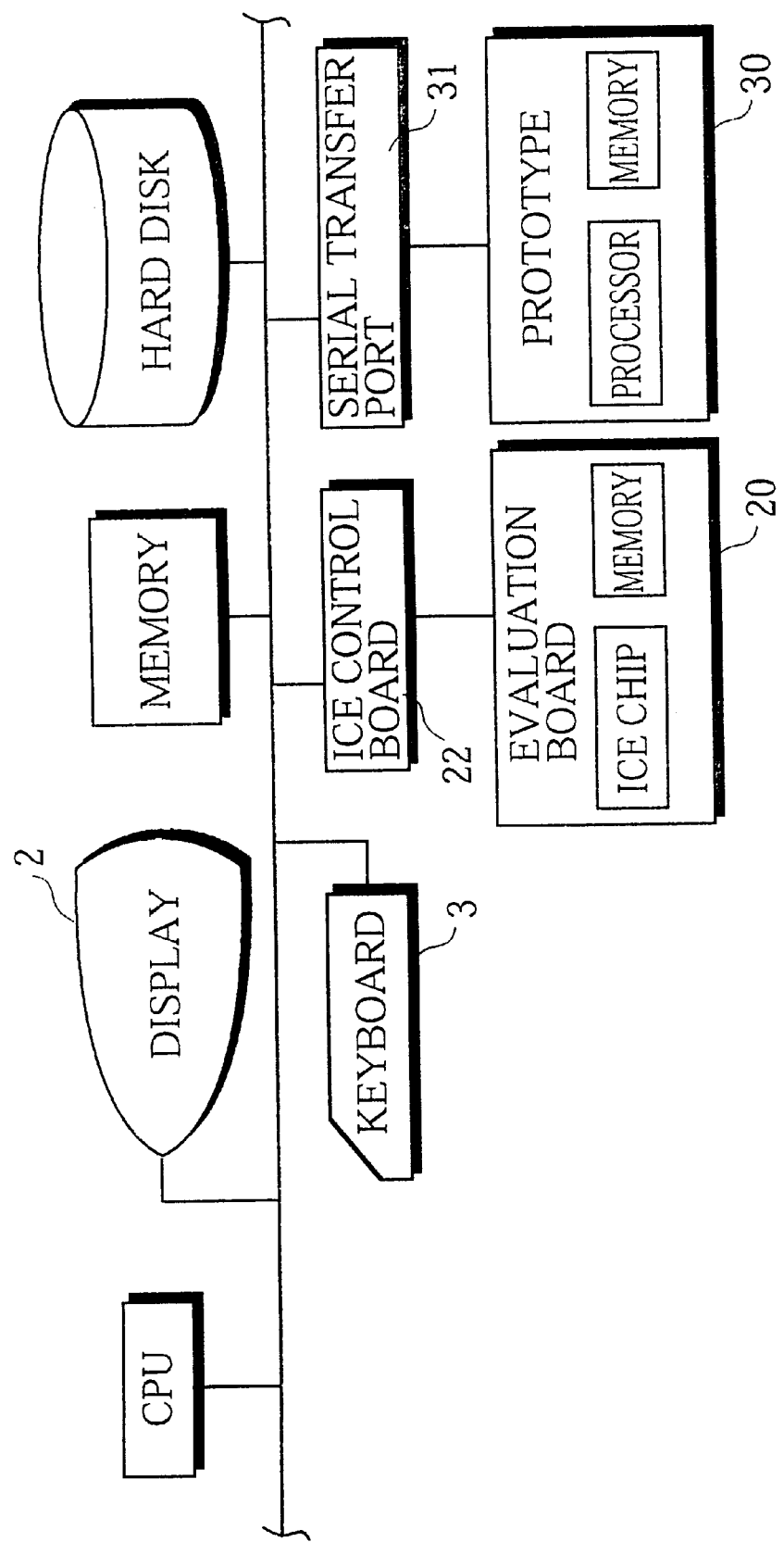
FIG. 1B is a block diagram showing the hardware construction of the debugging apparatus of the present embodiment.

FIG. 1B is a block diagram showing the hardware construction of the debugging apparatus of the present invention. As shown in the drawing, host computer 1 is a general-purpose computer including a CPU, display 2, a memory, a hard disk, keyboard 3, ICE control board 22, and serial transfer port 31. Host computer 1 is connected to evaluation board 20, and prototype 30 respectively via ICE control board 22 and serial transfer port 31.

FIG. 2A shows the hardware construction of prototype 30. As shown in the drawing, prototype 30 includes processor 33, memory 34, and peripheral I/O register set 35.

Processor 33 includes an instruction read circuit, a decoder, a calculator, a register set, and a program counter. The instruction read circuit reads machine-language instructions from the debug target program one at a time. The decoder decodes the machine language instructions. The calculator performs a calculation if a read instruction is an operation instruction. The program counter notifies the instruction read circuit of destinations into which instructions are stored. Processor 33 also includes dedicated terminal 39. Processor 33 reads operation state information and outputs the information to host computer 1 via dedicated terminal 39 when processor 33 receives a certain instruction signal via dedicated terminal 39.

Memory 34 stores monitoring program 36 and debug target program 37 and includes work area 38. When prototype 30 is activated, processor 33 runs debug target program 37. Debug target program 37 includes monitoring instructions which instruct processor 33 to branch to monitoring program 36 when data is input to dedicated terminal 39.

Monitoring program 36, on receiving data via dedicated terminal 39, allows control to branch from debug target program 37 to monitoring program 36.

Peripheral I/O register set 35 hold values of peripheral I/O devices, such as a serial interface, a parallel interface, an interrupt controller, an A/D converter, a D/A converter, and a timer counter. It is possible for processor 33 to fetch an arbitrary value of an arbitrary peripheral I/O device since values of the peripheral I/O devices are respectively atored in the registers making up peripheral I/O register set 35.

Figure 2B:
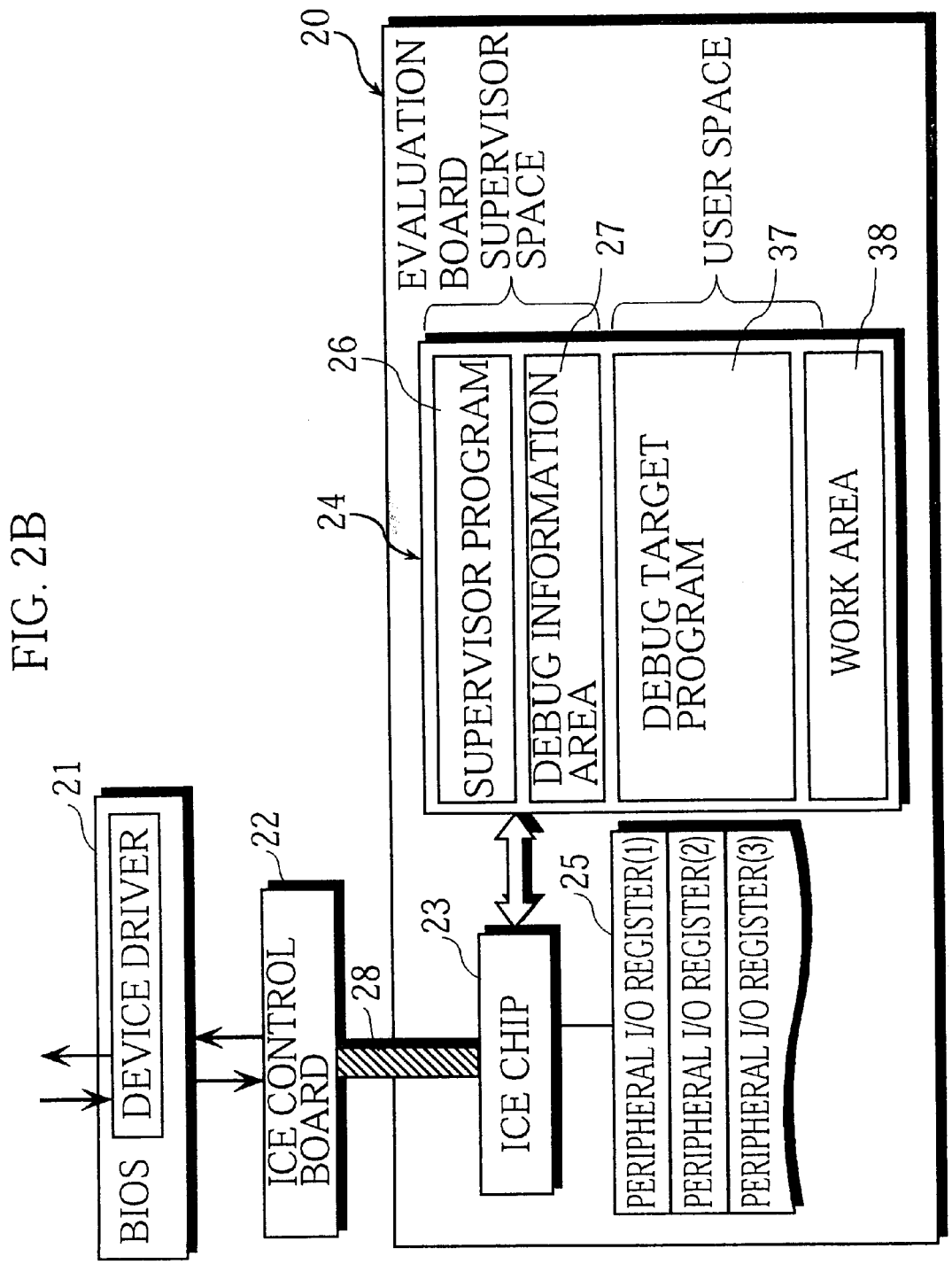
FIG. 2B shows the hardware construction of the ICE type hardware environment.

FIG. 2B shows the hardware construction of evaluation board 20. Compared with prototype 30, it is found that processor 33 is replaced by ICE chip 23. Evaluation board 20 also includes memory 24 and peripheral I/O register set 25.

Memory 24 includes a supervisor space and a user space. The supervisor space includes supervisor program 26 and debug information area 27. The user space includes debug target program 37 and work area 38.

Peripheral I/O register set 25 is composed of registers which hold values of corresponding peripheral I/O devices.

Supervisor program 26 includes a breakpoint setting tool, a trace tool, and an interrupt setting tool. The breakpoint setting tool sets breakpoints, where the breakpoint indicates a point where an interrupt signal is generated, or a point where an operation stops. The trace tool accumulates addresses of instructions executed by ICE chip 23. The interrupt setting tool monitors whether a certain condition set by the operator is met, and if the condition is met, generates an interrupt signal.

Debug information area 27 is an area in the memory which is used as a work area by supervisor program 26. Debug information area 27 stores breakpoint addresses, breakpoint information, trace data, and interrupt signal generation condition information. The breakpoint information indicates whether the breakpoint is effective. The trace data is composed of a plurality of accumulated addresses of instructions. The interrupt signal generation condition information indicates a certain condition set by the operator for generating interrupt signals.

FIG. 14A shows breakpoint addresses. "BREAK POINT (1)=0x0020" indicates that the first breakpoint is set in an area with a certain size specified by address 0x0020. "BREAK_POINT(2)=0x0250" indicates that the second breakpoint is set in an area with a certain size specified by address 0x0250. "BREAK_POINT(3)=0x0300" indicates that the third breakpoint is set in an area with a certain size specified by address 0x0300. Such breakpoint addresses, which are set by the operator, are written in memory 24 by the breakpoint setting tool of supervisor program 26.

FIG. 14B shows an interrupt signal generation condition. In the drawing, "CONDITION(1)=20 cycle,Int3" indicates that an instruction is executed for 20 cycles then the third interrupt signal is generated, where a cycle representing a unit instruction execution time. "CONDITION(2)=150 cycle,Int5" indicates that an instruction is executed for 150 cycles then the fifth interrupt signal is generated. Such interrupt signal generation conditions are written into memory 24 by the interrupt signal generating tool of supervisor program 26 which is activated by debug target program 37 when the operator sets the interrupt generation while debugging debug target program 37.

FIG. 14C shows the trace data. The trace data shows the history or executed instructions, and "0x0000, 0x0001, 0x0002; 0x0003, 0x0004, 0x0005," indicates, for example, that ICE chip 23 has executed the machine-language instructions of debug target program 37 which are stored in the areas respectively specified by addresses 0x0000, 0x0001, 0x0002, 0x0003, 0x0004, and 0x0005. Such trace data is written in memory 24 by the trace tool of supervisor program 26 which is executed by processor 33 when the operator inputs the trace command while debugging debug target program 37 in the ICE type hardware environment.

Work area 38 is a work area used by debug target program 37.

FIG. 3 shows internal layers of host computer 1. As shown in the drawing, host computer 1 is divided into application layer 11, operating system layer 12, BIOS (Basic Input/Output System) layer 13, and physical layer 14, which make up a standard construction of a general-purpose computer. Application layer 11 includes simulator 10. This indicates that simulator 10 is an application program that runs on an operating system. ICE control board 22 and serial transfer port 31 exist in physical layer 14. A dedicated device driver 21 in the BIOS layer is connected to ICE control board 22.

Since simulator 10 exists in application layer 11, it is required to use the format of application layer 11 to access the simulator type hardware environment. Device driver 21 exists in BIOS layer 13. Thus, it is required to use the format of BIOS layer 13 to access the ICE type hardware environment. Since serial transfer port 31 exists in physical layer 14, it is required to use the format of physical layer 14 to access the monitor type hardware environment.

Accordingly, when parameters are transferred among the hardware environments, the formats should be changed according to the layers or the target hardware environments.

Parameters should be transferred to simulator 10 in the formats of arguments since simulator 10 is an application program in application layer 11. Parameters should be transferred to device driver 21 in the formats of commands since device driver 21 is in BIOS layer 13. Parameters should be transferred to serial transfer port 31 through I/O ports since serial transfer port 31 is in physical layer 14.

The ICE, monitor, and simulator type hardware environments are respectively assigned identifiers TARGET1, TARGET2, and TARGET3 which are registered in an identifier table (not shown in the drawings).

FIG. 4 shows the sub-layers in application layer 11 which have the function of synthesizing the formats of hardware environments.

Target dependent layer 53 converts the various data formats of the other layers (hardware environments) into the format of arguments.

Target interconnect layer 52, including a shared work area in which data with the format of arguments is stored, allows the data to be shared by the three hardware environments.

Debug core layer 51 has the function as a symbolic debugger.

User interface layer 50 provides the function as a a man-machine interface. For this purpose a standard input/output library (not shown in the drawings) of operating system layer 12 is used. User interface layer 50 displays a message on the screen urging the operator to input a command. In doing so, the standard input/output library of operating system layer 12 is used. When the operator inputs a command responding to the message, user interface layer 50 allows debug core layer 51 and other sub-layers to interpret and execute the command. User interface layer 50 then displays the execution results on the screen using the standard input/output library.

Figure 5:
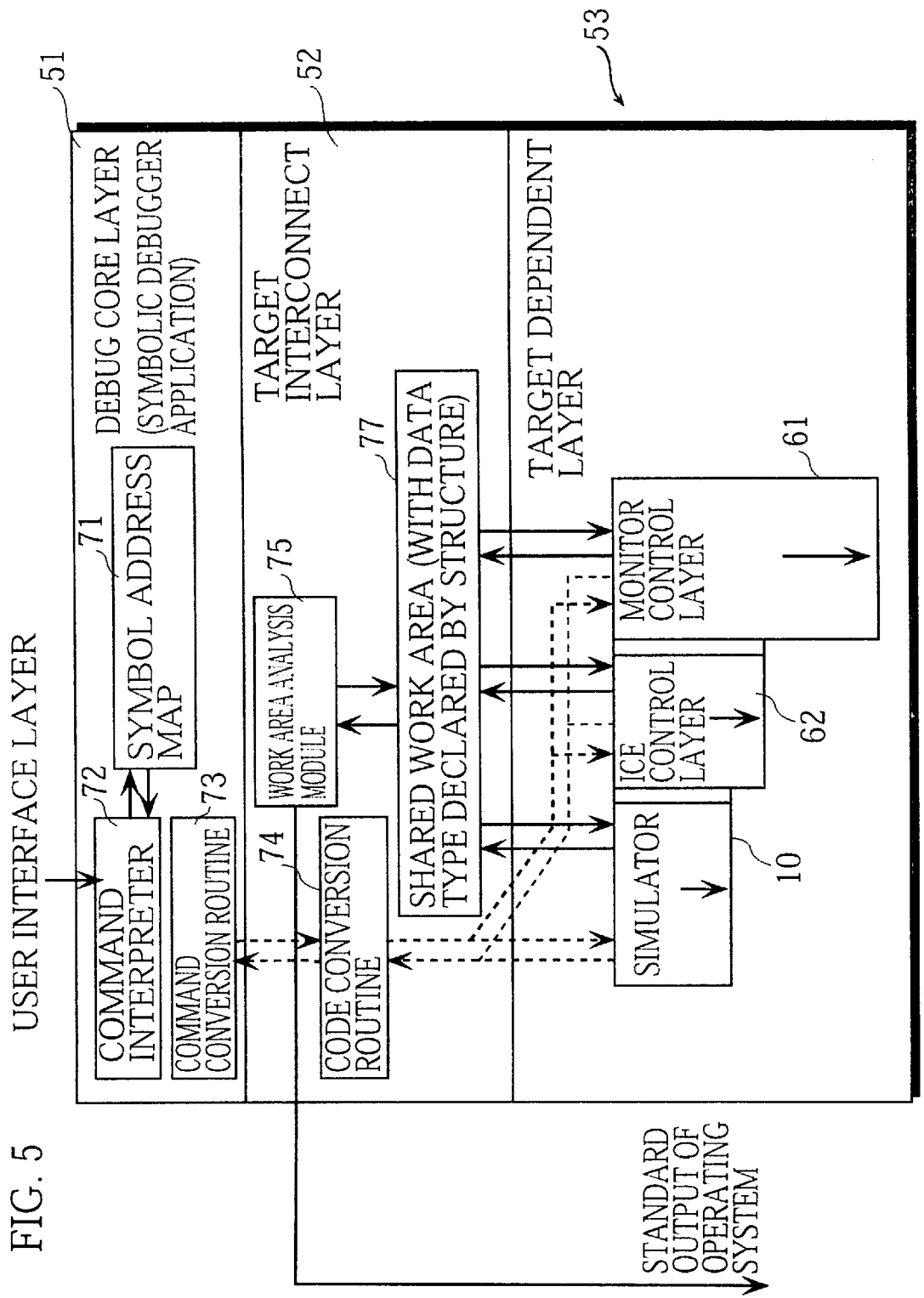
FIG. 5 shows the contents of the sub-layers in application layer 11.

FIG. 5 shows the contents of the sub-layers: debug core layer 51, target interconnect layer 52, and target dependent layer 53.

As shown in the drawing, debug core layer 51 includes symbol address map 71, command interpreter 72, and command conversion routine 73.

Symbol address map 71 is information indicating the relation between symbols and addresses in the memory, where symbols represent variables, libraries and the like used in the source program. More specifically, symbol address map 71 is composed of memory sizes, variable types, identification numbers or the lines which include source codes, and line information which indicates addresses of execution codes corresponding to the lines.

Figure 6A:
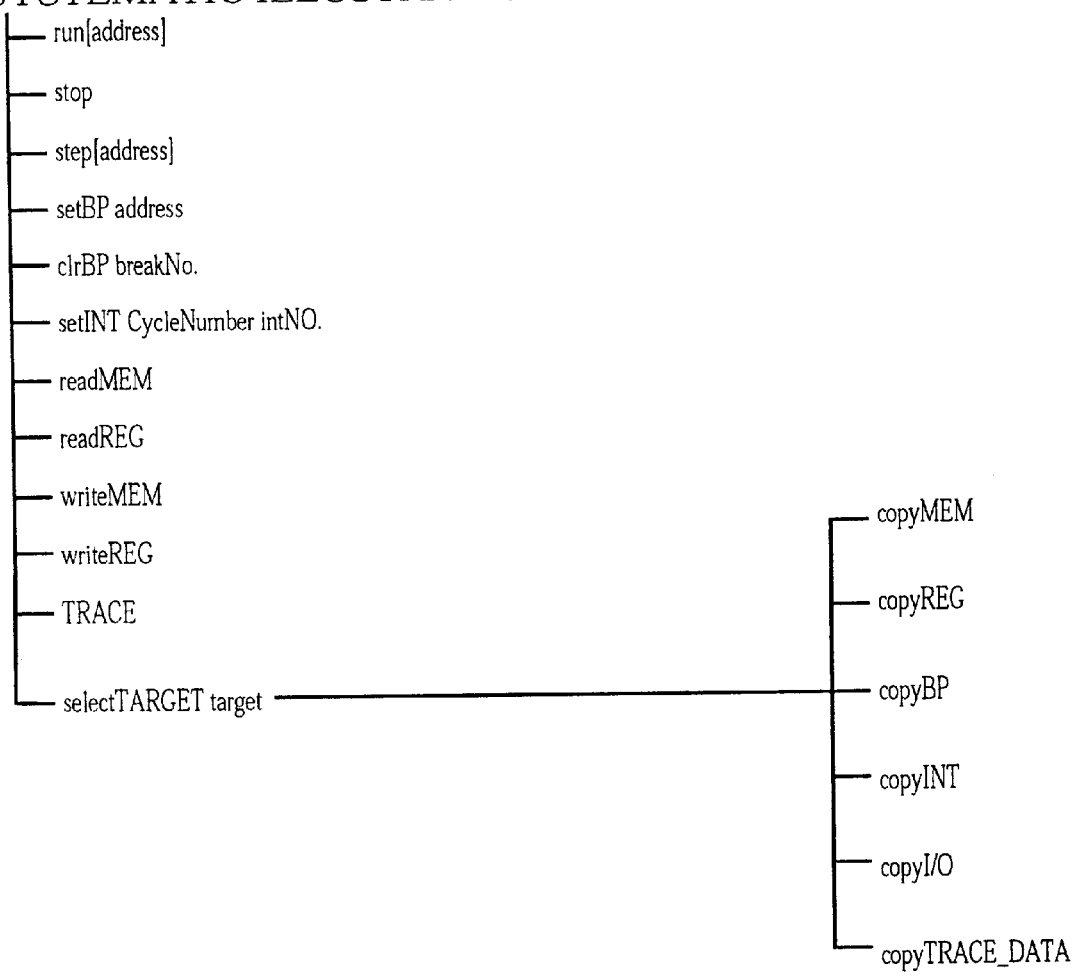
FIG. 6A is a systematic illustration of debug commands which are used in the present embodiment.

Command interpreter 72 analyzes the commands input by the operator and then sent to user interface layer 50, and notifies command conversion routine 73 of the contents of the commands. FIG. 6A shows such commands which are called debug commands.

The commands shown in FIG. 6A, except the selectTARGET command, have been used conventionally. These commands, however, are differently used in the present embodiment in that these commands specify a target hardware environment with a corresponding identifier (any of TARGET1, TARGET2, and TARGET3).

The run command instructs the target hardware environment to start running the debug target program starting from an address which is specified in the command as an operand.

The stop command instructs the target hardware environment to stop running the debug target program.

The step command instructs the target hardware environment to sequentially execute the instructions written in the debug target program starting from an address which is specified in the command as an operand.

The setBP command instructs the target hardware environment to set a breakpoint at an address which is specified in the command as an operand, where the setting of the breakpoint indicates the writing of an instruction for generating an interrupt signal into debug target program 37, or indicates the storing of an address of an operation stop in a certain register of the processor. In the present embodiment, when the instruction for generating an interrupt signal is written into debug target program 37, the address of the instruction is also written in a memory of the current hardware environment.

The clrBP command instructs the target hardware environment to delete a breakpoint specified by operand "breakNo." In case the breakpoint is the instruction for generating an interrupt signal, the address of the instruction is also deleted.

The setINT command instructs the target hardware environment to monitor whether an instruction is executed for number of cycles specified by operand "CycleNumber" and to generate the interrupt signal specified by operand "intNO." after the instruction is executed for 20 cycles, where a cycle representing a unit instruction execution time.

The readMEM command instructs the target hardware environment to read data from an area ranging from "s_address" to "e_address" which are operands in the command.

The readREG command instructs the target hardware environment to read data from a register specified by operand "register" of the command.

The writeMEM command instructs the target hardware environment to write data, which is specified by operand "value1" of the command, into an area specified by operand "address" of the command.

The writeREG command instructs the target hardware environment to write data, which is specified by operand "value2" of the command, into a register specified by operand "register" of the command.

Variables may be used as operands in the readMEM, readREG, writeMEN, and writeREG commands. When a variable is used in such a command, command interpreter 72 refers to symbol address map 71 to specify an address or a register corresponding to the variable. Command interpreter 72 then sends the command to the target hardware environment via target interconnect layer 52.

The TRACE command instructs the target hardware environment to accumulate the addresses of the instructions which have been executed the hardware environment.

The selectTARGET command instructs the target hardware environment to transfer the operation state information, which is stored in the storages of the target hardware environment, to another hardware environment, and instructs that the debug commands should be issued to the other hardware environment. When the operation state information is transferred, data in the storages, namely, content of work area 38, contents of registers, a breakpoint, interrupt signal generation condition information, contents of peripheral I/O registers, and trace data, is transferred separately. Command interpreter 72 issues sub-commands such as copyMEM, copyREG, copyBP, copyINT, copyI/O, and copyTRACE_DATA, to achieve such separate transfers, The copyMEM sub-command instructs target interconnect layer 52 to transfer the contents of work area 38 of the target hardware environment to another hardware environment which is specified by the selectTARGET command. The copyMEM sub-command may also specify a start address and an end address of an arbitrary area to instructs target interconnect layer 52 to transfer the contents of the arbitrary area of the target hardware environment to another hardware environment. The copyMEM sub-command may also include a switch indicating whether to transfer the whole contents of the memory to another hardware environment.

The copyREG sub-command instructs target interconnect layer 52 to transfer the contents of the register set of the target hardware environment to another hardware environment which is specified by the selectTARGET command.

The copyBP sub-command instructs target interconnect layer 52 to transfer the breakpoint address of the target hardware environment to another hardware environment which is specified by the selectTARGET commands.

The copyINT sub-command instructs target interconnect layer 52 to transfer the interrupt signal generation condition information of the target hardware environment to another hardware environment which is specified by the selectTARGET command.

The copyI/O sub-command instructs target interconnect layer 52 to transfer the contents of all the peripheral I/O registers of the target hardware environment to another hardware environment which is specified by the selectTARGET command.

The copyTRACE_DATA instructs target interconnect layer 52 to transfer the trace data of the target hardware environment to another hardware environment which is specified by the selectTARGET command.

The following is a continued description of the components of debug core layer 51.

Command conversion routine 73 converts commands interpreted or automatically issued by command interpreter 72 into function call codes.

Command conversion routine 73 converts, for example, the readMEM command, which is one of the instructions for reading state information, into function call code "TCI_get mem(adr,length,unit,image)," where "TCI" stands for Target Core Interface, indicating that the present function call code is used between debug core layer 51 and target interconnect layer 52. As is understood from this, the function call codes are used only in limited layers. "get_mem" of the above function call code indicates that a value should be obtained from a memory. Each of "adr," "lengLh," "unit," and "image" is an argument. Augument "adr" indicates a start address. Argument "length" indicates the length of the obtained data. Argument "unit" indicates a unit used in obtaining data, such as byte, word, and double-ward. Argument "image" indicates a Larget area into which the data is transferred from the memory.

In the above example, when command interpreter 72 interprets an input command as the readMEM command, an instruction by a corresponding function call code is sent from debug core layer 51 to target interconnect layer 52. A hardware environment reading the data is not specified in the function call code. That means, the definition of the function call code is of an abstract level.

Command conversion routine 73 converts, for example, the writeREG command, which is one of the instructions for writing state information, into function call code "TCI_set REG(regs,mask)," "set_REG" of the above function call code indicator that an immediate value should be set. Each of "regs" and "mask" is an argument. Argument "regs" indicates an array name of one of array variables in the shared work area which respectively hold values of registers, such as a general purpose register, a program counter, a state register, a data register, and an address register. Argument "mask" indicates a bit pattern for masking which specified which array elements in the array variable specified by the argument "regs" are set in the processor in the target hardware environment and which array elements are not set.

Similarly, command conversion routine 73 converts the run, stop, step, setBP, clrBP, SetINT, readREG, writeMEM, and TRACE commands respectively into function call codes "TCI run," "TCI_stop," "TCI_step," "TCI_setBP," "TCI_clrBP," "TCI SetINT," "TCI_read_REG," "TCI_write_MEM," and "TCI_TRACE" and sends the function call codes to target interconnect layer 52.

Each sub-command is converted into a pair of function call codes: "TCI_getxxx" for instructing the first hardware environment (source target hardware environment) to read the state information from a storage, and "TCI_setxxx" for instructing the second hardware environment (destination target hardware environment) to write the state information into a storage.

FIG. 8 shows the sub-commands and the corresponding function call codes.

As shown in the drawing, the copyMEM sub-command is converted into two function call codes;

"TCI_get_mem(adr,length,unit,image)" and
"TCI_set_mem(adr,length,unit,image)."

Function code "TCI_get_mem(adr,length,unit,image)" instructs the source target hardware environment to read data from work area 38.

Function code "TCI_set_men (adr,length,unit,image)" instructs the destination target hardware environment to write the data into work area 38.

As shown in the drawing, only function call codes "TCI get_reg(regs,mask)," "TCI_set_reg(regs,mask)," "TCI_get_INT(cycle,intkind)," "TCI_set_INT(cycle,intkind)" have two arguments and other function call codes, which transfer data between memories, have four arguments. Note that peripheral I/O register sets 25 and 35 can be accessed through memories.

Here, the function call codes corresponding to the copyBP sub-command are described. Generally, breakpoints are specified by addresses of machine-language instructions in the debug target program. For specifying such addresses, arguments "length" and "unit" are not necessary. In the present embodiment, however, so-called "area break" is considered, in which an area effective as the breakpoint can be specified. Arguments "adr," "length," "unit," and "image," including the specifications of the length of the data for the breakpoint and the unit of the data, make it possible to use the area break.

In function call codes "TCI_get_INT(cycle,intkind)" and "TCI_set_INT(cycle,intkind)" corresponding to the CopyINT sub-command, argument "cycle" indicates an integral multiple of a unit instruction execution time and argument "intkind" indicates a signal number or the interrupt signal to be generated.

Target interconnect layer 52, as shown in FIG. 5, is composed of code conversion routine 74, work area analysis module 75, and shared work area 77. Of these, code conversion routine 74 and shared work area 77 are described now and work area analysis module 75 will be described later.

Code conversion routine 74 rewrites the function call codes (high function call codes) to low function call codes which specifies the destination target hardware environment.

Suppose the first hardware environment is monitor type and the second hardware environment is simulator type. An example is given below under this condition. Suppose command conversion routine 73 has converted the copyMEM sub-command into high function code "TCI_get_mem (adr,length,unit,image)" which instructs the source target hardware environment to read data from work area 38. Code conversion routine 74 converts the high function call code into low function call code "MON_get_mem(adr,length,unit,image)," specifying the monitor type hardware environment as the source target hardware environment.

Code conversion routine 74 then converts high function call code "TCI_set_mem(adr,length,unit,image)" into low function call code "SIM_set_mem(adr,length,unit,image)," specifying the simulator type hardware environment as the destination target hardware environment. After the conversion, code conversion routine 74 calls a function using the converted low function call codes.

Code conversion routine 74 performs similar conversions against other function call codes as shown in FIG. 8. FIG. 9 shows the high function call codes and corresponding low function call codes.

When rewriting the function call codes, code conversion routine 74 identifies the source target hardware environment and destination target hardware environment. For identifying the source target hardware environment, code conversion routine 74 refers to the identifier table. For identifying the destination target hardware environment, code conversion routine 74 receives the selectTARGET command from command interpreter 72 and refers to an operand of the command.

Shared work area 77 is a work area which is shared by all the hardware environments and an area of shared work area 77 may be specified by argument "image."

Target dependent layer 53 is composed of simulator 10, monitor control layer 61, and ICE control layer 62.

Figure 2C:
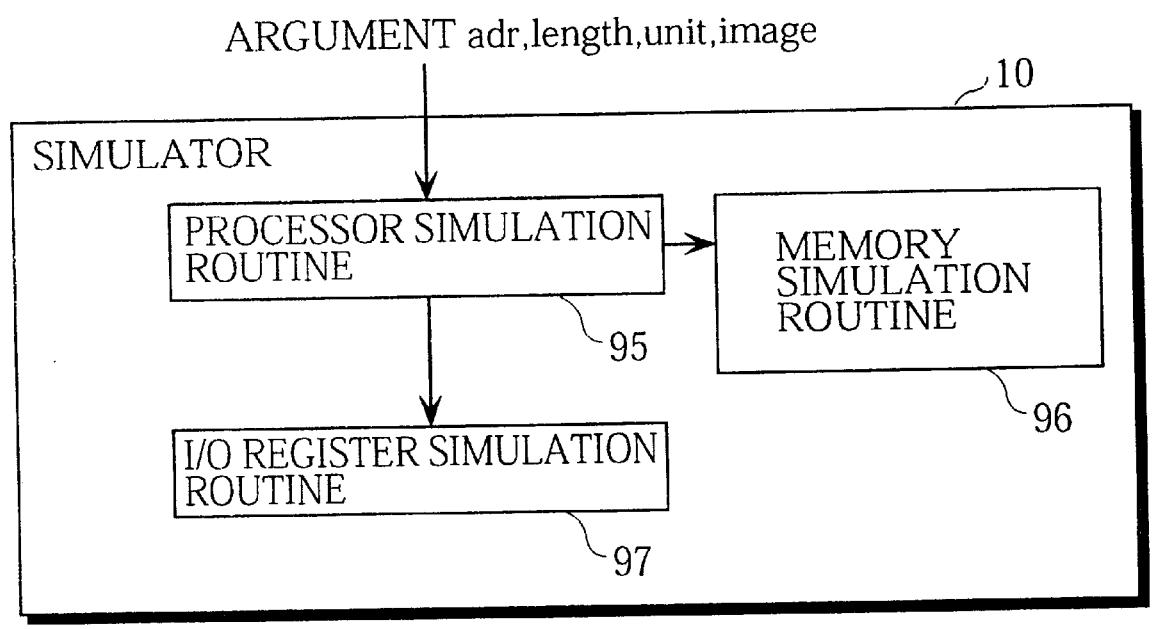
FIG. 2C shows the construction of the simulator type hardware environment.

Simulator 10 is an application program. FIG. 2C shown the construction of simulator 10. As shown in the drawing, simulator 10 is composed of processor simulation routine 95, memory simulation routine 96, and I/O register simulation routine 97.

Processor simulation routine 95 simulates the function of processor 33.

Memory simulation routine 96 stores, as memory 24 does, supervisor program 26, debug information area 27, debug target program 37, and work area 38. Judged from this construction, the bug analysis ability of the simulator type hardware environment is almost the same as that of the ICE type hardware environment.

I/O register simulation routine 97 simulates the function of peripheral I/O register set 35.

Processor simulation routine 95, memory simulation routine 96, and I/0 register simulation routine 97 are activated when code conversion routine 74 calls a function using low function call codes specifying the simulator type. When code conversion routine 74 calls a function with low function call code "SIM_get_mem(adr,length,unit,image)," processor simulation routine 95 reads data from an area in memory simulation routine 96 specified by start address "adr" in units specified by "unit," the data having a length specified by "length." Processor simulation routine 95 then stores the data into an area of shared work area 77 specified by "image."

When code conversion routine 74 calls a function with low function call code "SIM_set_mem(adr,length,unit,image)," processor simulation routine 95 reads data from an area of shared work area 77 specified by "image" in units specified by "unit," the data having a length specified by "length." Processor simulation routine 95 then writes the data into an area in memory simulation routine 96 specified by start address "adr."

Monitor control layer 61 controls the operation of the debug target program in prototype 30 and accesses the storages in prototype 30, such as memories and registers. Thus, monitor control layer 61 activates the debug target program or reads/writes data from/into the storages with a desired timing.

Monitor control layer 61 achieves the above control of the data reading/writing by performing certain communications sequences with monitoring program 36 via serial transfer port 31, dedicated terminal 39, and serial line 40. Debug core layer 51 performs such a communications sequence when code conversion routine 74 calls a function.

FIG. 10A shows the control of the data reading by monitor control layer 61. As shown in the drawing, monitor control layer 61 performs a communications sequence to control the data reading when code conversion routine 74 calls a function with low function call code "MON_get mem(adr,length,unit,image)." In the communications sequence, monitor control layer 61 transmits/receives the packets, which are shown in (2) of the drawing, according to the protocol as shown in (1) of the drawing.

Each of the three types of packets shown in (2) of FIG. 10A, namely, packets "MEMREAD," "ACK," "UNIT," and "DATA," has eight bytes.

The first byte (denoted as byte 0) of packet "MEMREAD" is assigned to field "CMD" in which a command type is specified. The second byte (denoted as byte 1) is assigned to field "UIT" in which a unit (byte, word, double-word, etc.) used in reading data from a memory is specified. The third and fourth bytes (denoted as bytes 2 and 3) are assigned to field "SIZE" in which a length of data to be read from a memory is specified. The fifth byte to the eighth byte (denoted as bytes 4 to 7) are assigned to field "ADRS" in which an address of a memory from which data is read is specified.

The first byte of packet "ACK" indicates a type of an error which has occurred in monitoring program 36.

Figure 11A:
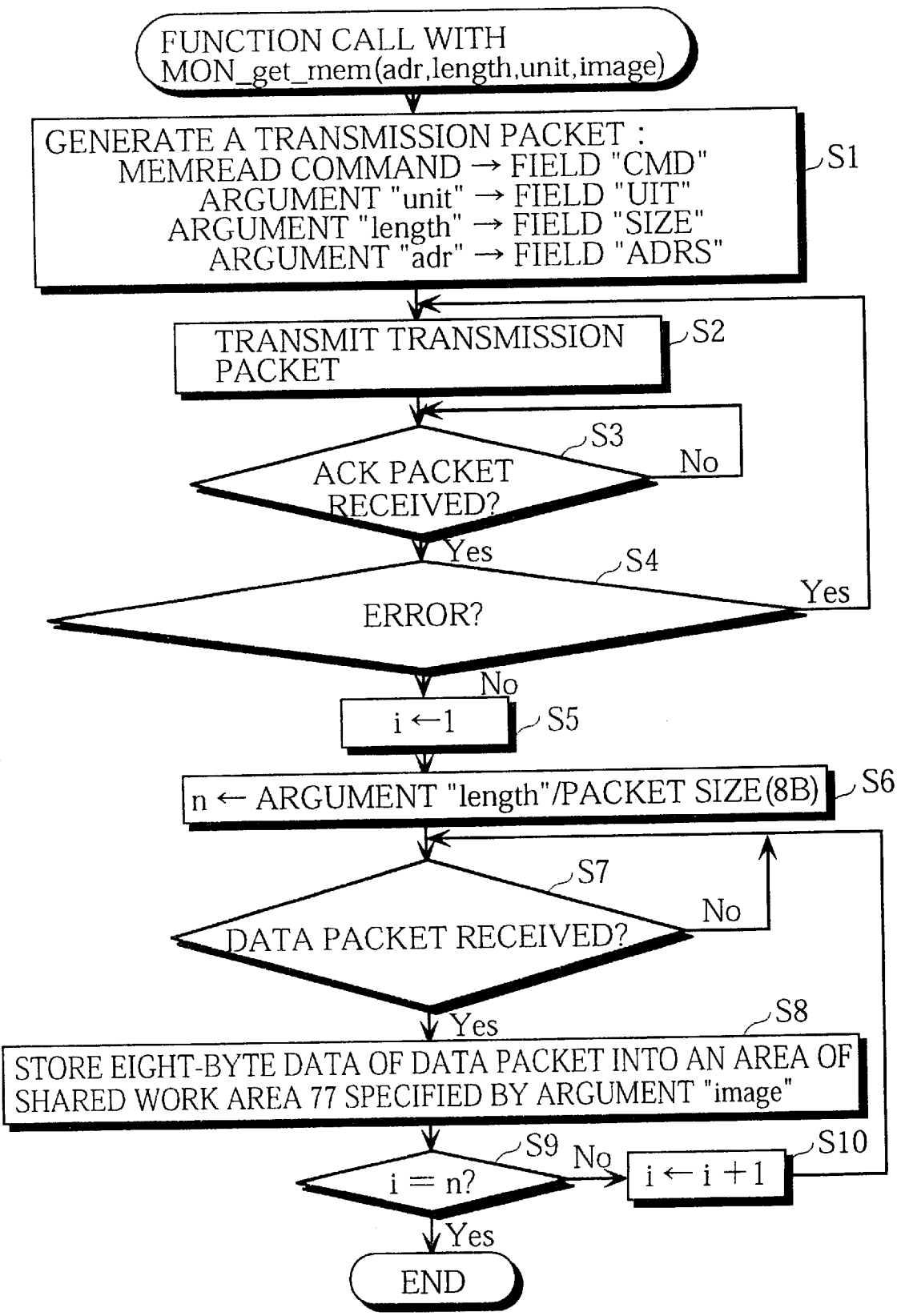
FIG. 11A is a flowchart of the procedure of the communications sequence to control reading data from memories, which is performed by monitor control layer 61.

FIG. 11A is a flowchart of the procedure of the communications sequence to control reading data from memories, which is performed by monitor control layer 61.

When code conversion routine 74 calls a function with low function call code "MON_get_mem(adr,length,unit,image)," monitor control layer 61 generates a transmission packet "MEMREAD" by setting each field. More specifically, monitor control layer 61 writes an identification code of the MEMREAD command into field "CMD," writes a code of unit name specified by argument "unit" into field "UIT," writes a data length specified by argument "length" into field "SIZE," and writes a read-target address of argument "adr" into field "ADRS" (step S1). Monitor control layer 61 transmits the generated transmission packet to monitoring program 36 via serial line 40 (step S2). Monitor control layer 61 then waits for reception packet "ACK" (step S3). If monitor control layer 61 receives reception packet "ACK," monitor control layer 61 judges whether the first byte of reception packet "ACK" indicates an error (step S4). If it indicates an error, monitor control layer 61 returns to step 52 to retransmit the generated transmission packet; if it does not indicate an error, monitor control layer 61 proceeds to step S5. In stop S5, monitor control layer 61 sets variable i to "1." In step S6, monitor control layer 61 sets variable n to the specified data length divided by the packet size (eight bytes). Here, variable i indicates the number of reception packets "DATA" having been processed and variable n indicates the total number of reception packets "DATA."

After setting the above variables to above initial values, monitor control layer 61 waits for reception packets "DATA" (step S7). If monitor control layer 61 receives reception packets "DATA," monitor control layer 61 stores eight-byte data of each reception packet in an area of shared work area 77 specified by argument "image" (step S8). monitor control layer 61 then compares variable i with variable n to judge if they are equal (step S9); if not equal, monitor control layer 61 increments variable i (step S10) then goes to step S7.

Steps S7–S10 are repeated until monitor control layer 61 judges that variable i is equal to variable n in step S9.

During the repeated operations of steps S7–S10, data in prototype 30 is transferred to monitor control layer 61 eight bytes by eight bytes via serial transfer port 31, serial line 40, and dedicated terminal 39. The transferred data is accumulated in an area of shared work area 77 specified by argument "image." when the above operation is repeated n times, data with the length specified by argument "length" has been stored in the area of shared work area 77 specified by argument "image."

After data is transferred from memory 34 to shared work area 77, it is possible to transfer the data to simulator 10 and ICE control layer 62. That is, when code conversion routine 74 calls a function with low function call code "SIM_set_mem(adr,length,unit,image)" at this stage, the data is written into an area of memory simulation routine 96 specified by argument "adr."

Monitor control layer 61 repeatedly performs the communication sequence to transfer other pieces of state information of the storages of prototype 30, namely, contents of other registers, a breakpoint, interrupt signal generation condition information, contents of peripheral I/O registers, and trace data, into memory simulation routine 96 via shared work area 77.

Figure 10B:
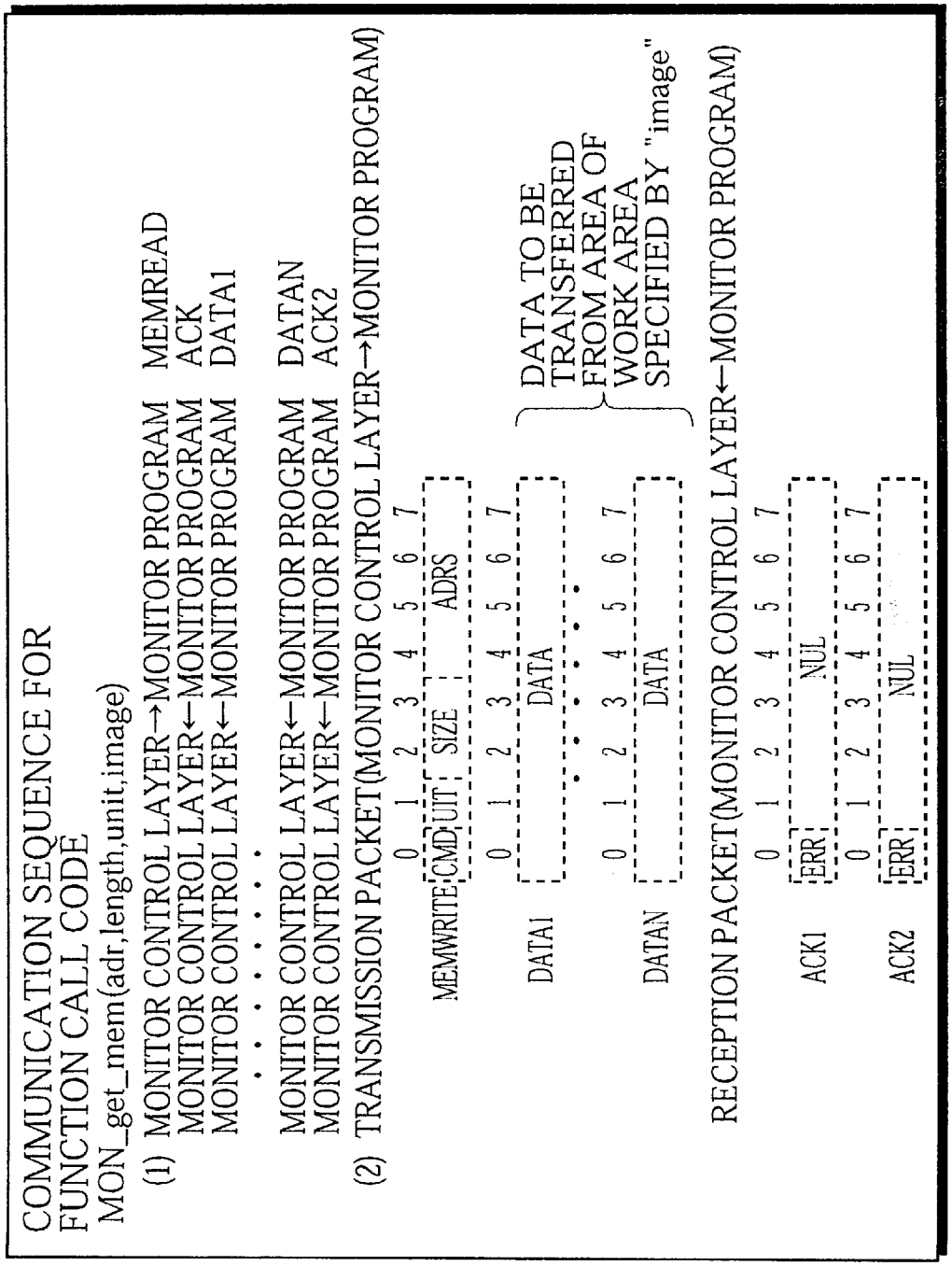
FIG. 10B shows the control of writing data into work area 38 in prototype 30 by monitor control layer 61.

FIG. 10B shows the control of the data writing by monitor control layer 61. As shown in the drawing, monitor control layer 61 performs a communications sequence to control the data writing when code conversion routine 74 calls a function with low function call code "MON_set mem(adr, length,unit,image)." In the communications sequence, monitor control layer 61 transmits/receives the packets, which are shown in (2) of the drawing, according to the protocol as shown in (1) of the drawing.

Each of the three types of packets shown in (2) of FIG. 10B, namely, packets "MEMWRITE," "ACK1," "ACK2," and "DATA," has eight bytes.

The first byte (denoted as byte 0) of packet "MEMWRITE" is assigned to field "CMD" in which a command type is specified. The second byte (denoted as byte 1) is assigned to field "UIT" in which a unit (byte, word, double-word, etc.) used in writing data into a memory is specified. The third and fourth bytes (denoted as bytes 2 and 3) are assigned to field "SIZE" in which a length of data to be written into a memory is specified. The fifth byte to the eighth byte (denoted as bytes 4 to 7) are assigned to field "ADRS" in which an address of memory 34 into which data is written is specified.

The first byte of packets "ACK1" and "ACK2" indicates a type of an error which has occurred in monitoring program 36.

Figure 11B:
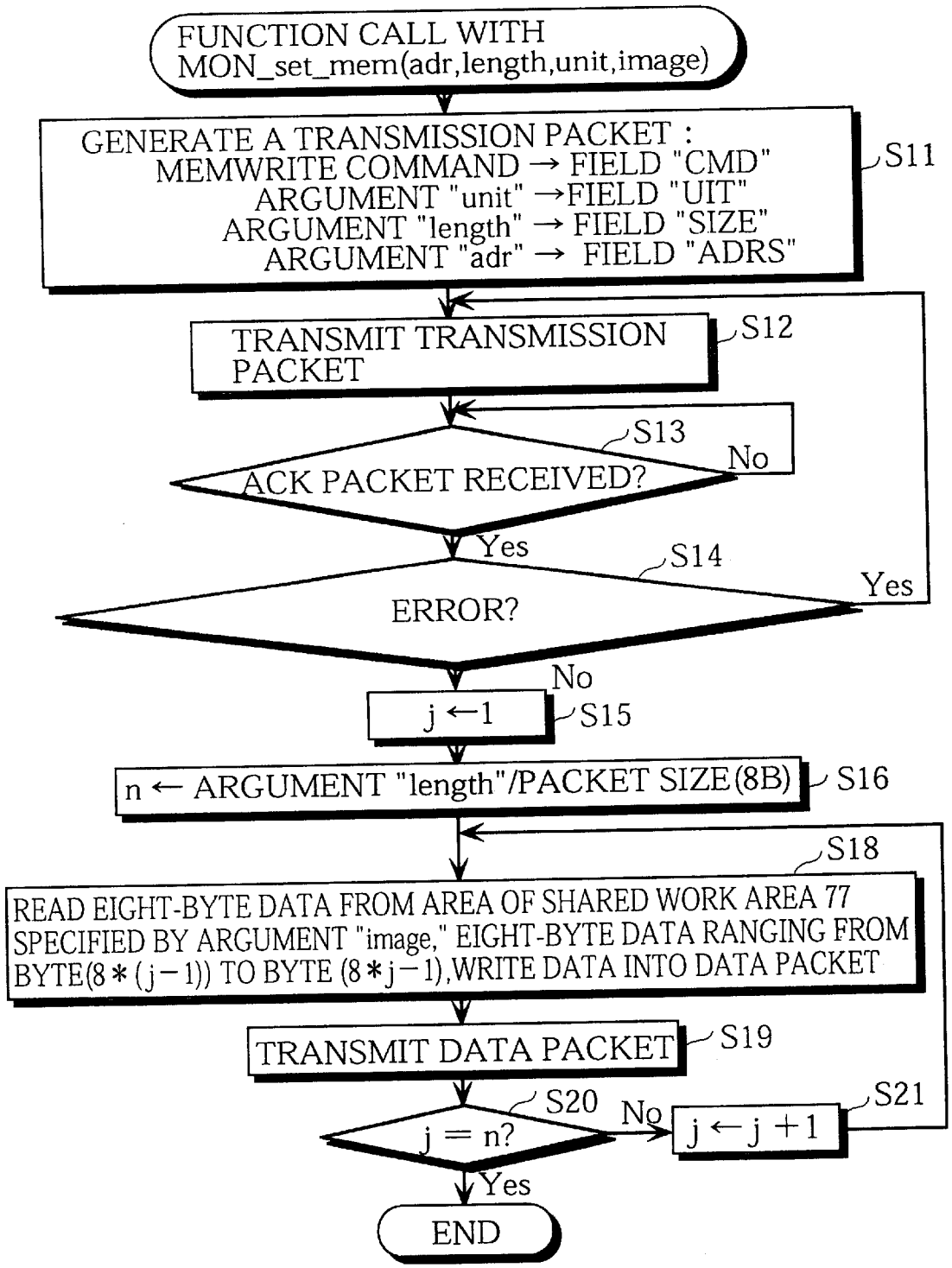
FIG. 11B is a flowchart of the procedure of the communications sequence to control writing of data into a memory, which is performed by monitor control layer 61.

FIG. 11B is a flowchart of the procedure of the communications sequence to control writing of data into a memory, which is performed by monitor control layer 61.

When code conversion routine 74 calls a function with low function call code "MON_set_mem(adr,length,unit, image)," monitor control layer 61 generates a transmission packet "MEMWRITE" by setting each field. More specifically, monitor control layer 61 writes a code representing the MEMWRITE command into field "CMD," writes a code representing a unit name of argument "unit" into field "UIT," writes a data length of argument "length" into field "SIZE," and writes a write-target address of argument "adr" into field "ADRS" (step S11). Monitor control layer 61 transmits the generated transmission packet to monitoring program 36 via serial line 40 (step S12). Monitor control layer 61 then waits for reception packet "ACK" (step S13). If monitor control layer 61 receives reception packet "ACK," monitor control layer 61 judges whether the first byte of reception packet "ACK" indicates an error (step S14). If it indicates an error, monitor control layer 61 returns to step S12 to re-transmit the generated transmission packets if it does not indicate an error, monitor control layer 61 proceeds to step S15. In step S15, monitor control layer 61 sets variable j to "1." In step S16, monitor control layer 61 sets variable n to the specified data length divided by the packet size (eight bytes). Here, variable j indicates the number of transmission packets "DATA" having been processed and variable n indicates the total number of transmission packets "DATA."

After setting the above variables to above initial values, monitor control layer 61 reads eight-byte data from an area of shared work area 77 specified by argument "image," the eight-byte data ranging from byle (8*(j−1)) to byte (8*j−1). In the first operation in this step, for example, the eight-byte data ranges from byte 0 to byte 7 since J=1. monitor control layer 61 then writes the eight-byte data into field "DATA" of a transmission packet "DATA" (step S18). monitor control layer 61 transmits the packet (step S19). monitor control layer 61 then compares variable j with variable n to judge if they are equal (step S20), if not equal, monitor control layer 61 increments variable j (step S21) then goes to step S18.

Steps S18–S21 are repeated until monitor control layer 61 judges that variable j is equal to variable n in stop S20.

During the repeated operations of steps S18–S21, data in shared work area 77 is transferred to memory 34 eight bytes by eight bytes via serial transfer port 31, serial line 40, and dedicated terminal 39. The transferred data is accumulated in memory 34. When the above operation is repeated n times, data with the length specified by argument "length" has been stored in memory 34.

Monitor control layer 61 repeatedly performs the communication sequence to transfer other pieces of state information of shared work area 77, namely, contents of other registers, a breakpoint, interrupt signal generation condition information, contents of peripheral I/O registers, and trace data, into a storage of prototype 30.

It is possible to transfer data of simulator 10 and ICE control layer 62 from shared work area 77 to memory 34 by writing the data in shared work area 77 in advance before code conversion routine 74 calls a function using low function call code "MON_set_mem(adr,length,unit,image)."

ICE control layer 62 controls ICE chip 23 in evaluation board 20. That is, ICE control layer 62 controls the debug target program and accesses the storages, such as memories and registers, in evaluation board 20. Thus, ICE control layer 62 activates the debug target program and writes data from the storages in evaluation board 20 into the debug target program with a desired timing.

ICE control layer 62 achieves the above control of the data reading/writing by issuing the BIOS command to device driver 21 when code conversion routine 74 calls a function with a low function call code specifying the ICE type hardware environment as the destination target hardware environment.

Figure 12A:
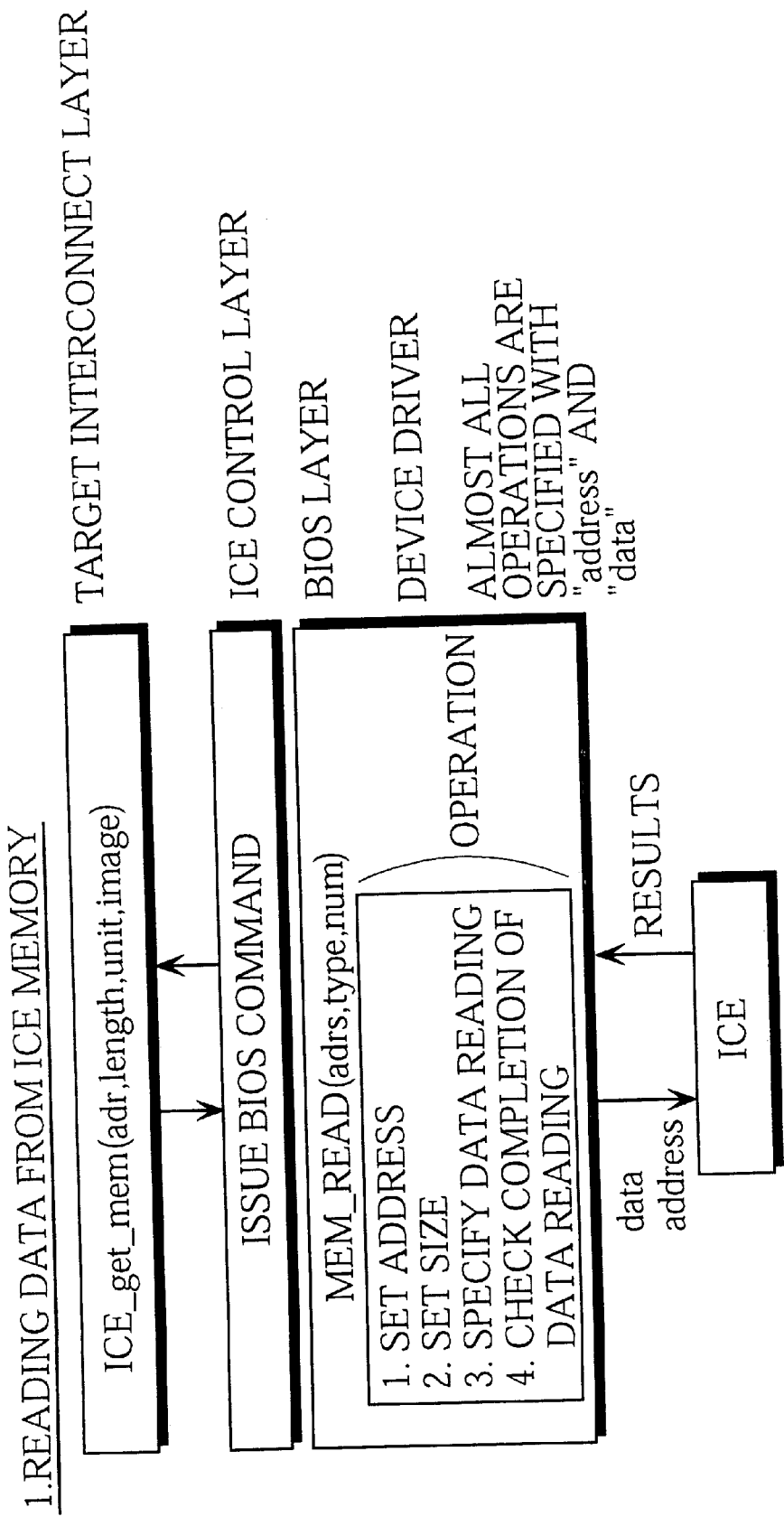
FIG. 12A shows the control of the data reading by ICE control layer 62.

FIG. 12A shows the control of the data reading by ICE control layer 62. As shown in the drawing, ICE control layer 62 issues BIOS command "MEM_READ(adrs,type,num)" to device driver 21 when code conversion routine 74 calls a function with low function call code "ICE_get_mem(adr, length,unit, image)."

The BIOS command includes the following parameters: "adrs" for indicating a read target address of debug target program 37 in evaluation board 20; "type," set by device driver 21, for indicating a unit of data reading in evaluation board 20 which is used in evaluation board 20; and "num" for indicating the number of "words," the data length of each of the "words" being equal to the unit specified by parameter "type," the value of "nun" being equal to the value of argument "length" divided by the value of argument "unit" when code conversion routine 74 calls a function.

ICE control layer 62 issues BIOS command "MEM READ(adrs,type,num)" to device driver 21 with the above described parameters. After issuing the command, ICE control layer 62 waits for device driver 21 to output a result. ICE control layer 62 receives the result as a value read from an area in memory 24 specified by argument "adr" in evaluation board 20, then stores the value into an area in shared work area 77 specified by parameter "adrs."

Figure 12B:
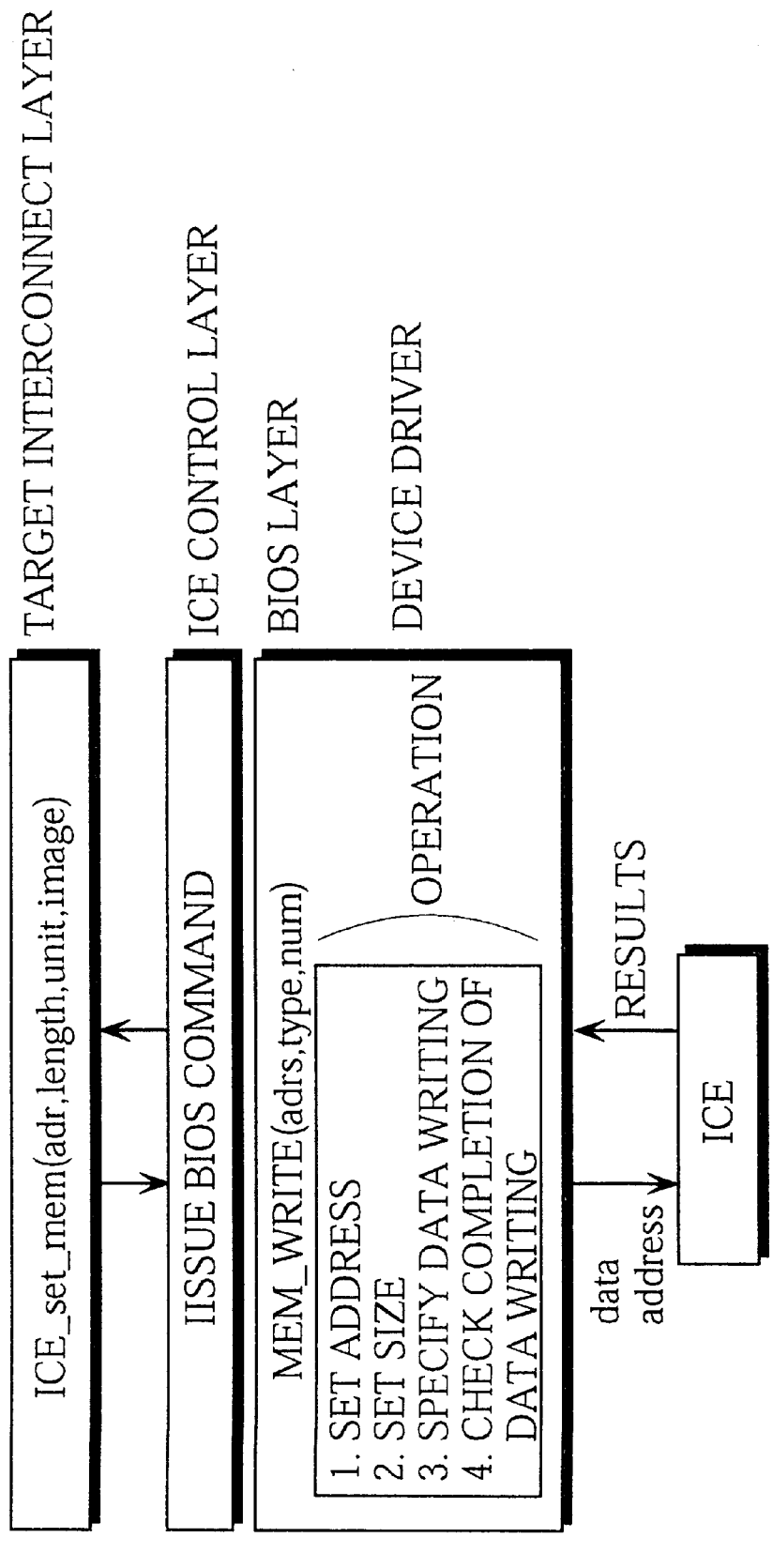
FIG. 12B shows the control by ICE control layer 62 when ICE control layer 62 writes data into debug target program 37 in evaluation board 20.

FIG. 12B shows the control by ICE control layer 62 when ICE control layer 62 writes data into debug target program 37 in evaluation board 20. ICE control layer 62 issues BIOS command "MEM_WRITE(adrs,type,num)" to device driver 21 When code conversion routine 74 calls a function with function call code "ICE_set_mem(adr,length,unit, image)." ICE control layer 62 then outputs a value in an area of shared work area 77 specified by argument "adr" to device driver 21 as a write target value.

Parameter "adrs" of the BIOS command indicates a write target address of debug target program 37 in evaluation board 20. Parameter "type" indicates a unit of data writing.

ICE control layer 62 issues BIOS command "MEM WRITE(adrs,type,num)" to device driver 21 with the above described parameters.

Device driver 21 sets storages for storing addresses, sizes, and operation types in evaluation board 20, according to the BIOS command issued by ICE control layer 62.

The reason for setting such storages is that ICE chip 23 interprets the contents of the storages as instructions from host computer 1 and operates according to the interpretation, such as reading/writing data from/to memories and setting breakpoints.

Device driver 21, on receiving BIOS command "MEM READ(adrs,type,num)" stores the value specified by parameter "adrs" into the storage for addresses, stores the value specified by parameter "num" into the storage for sizes, and stores operation type "read" into the storage for operation types. ICE chip 23 reads data from an area in memory 24 specified by parameter "adrs" in the unit specified by parameter "num." device driver 21 outputs the read data to ICE control layer 62 as the state information of memory 24 in evaluation board 20.

Device driver 21, on receiving BIOS command "MEM WRITE(adrs,type,num)," stores the value specified by parameter "advs" into the storage for addresses, stores the value specified by parameter "num" into the storage for sizes, and stores operation type "write" into the storage for operation types. Device driver 21 outputs data from an area of shared work area 77 specified by argument "image" which has been transferred from monitor control layer 61. ICE chip 23 writes the data into an area in memory 24 specified by parameter "adrs" in the unit specified by parameter "num."

The operation of the present debugging apparatus with the above consLruction is described below. FIG. 7 shows messages output by user interface layer 50.

When the debugging apparatus is activated, user interface layer 50 outputs message p1 shown in the drawing, "*HARDWARE ENVIRONMENT IS SET TO TARGET1. TARGET1 IS MONITOR TYPE." user interface layer 50 then outputs message "*INPUT COMMAND" and displays a prompt for urging the user to input a command.

Here, suppose the user inputs "readMEM 0x0100,16" on keyboard 3. User interface layer 50 transfers the input command to debug core layer 51 so that debug core layer 51 interprets and executes the command.

Command conversion routine 73 converts the command into function call code "TCI_read_mem(0x0100,16,byte, image)" and outputs the code to code conversion routine 74. Code conversion routine 74 converts the high function call code to a low function call code specifying a target hardware environment. In this case, the hardware environment is the monitor type. Thus low function call code "MON_read mem(0x0100,16,byte,image)" is generated.

When code conversion routine 74 calls a function with "MON_read_mem(0x01000,16,byte,image)," monitor control layer 61 reads data from prototype 30 one byte by one byte via serial transfer port 31, serial line 40, and dedicated terminal 39, as shown in the flowchart of FIG. 11A. Monitor control layer 61 accumulates the read data in an area of shared work area 77 specified by argument "image." When monitor control layer 61 repeats this process 16 times as specified by field "SIZE," data with the length specified by argument "length" has been stored in the area of shared work area 77 specified by argument "image."

User interface layer 50 displays the value currently stored in shared work area 77 with a message, as shown in FIG. 7:

"*TARGET1 STORES FOLLOWING VALUE FOR 0X0100,16

FF FF FF FF FF FF FF FF FF FF FF FF FF FF FF FF."
user interface layer 50 then outputs message "*INPUT COMMAND" and displays a prompt for urging the user to input a command.

Here, suppose the user inputs "writeREG D1,03" on keyboard 3. User interface layer 50 transfers the input command to debug core layer 51 so that debug core layer 51 interprets and executes the command.

Command conversion routine 73 converts the command into function call code "TCI_write_REG(D1,03)" and outputs the code to code conversion routine 74. Code conversion routine 74 converts the high function call code to a low function call code specifying a target hardware environment. In this case, the hardware environment is the monitor type. Thus low function call code "MON_write_REG(D1,03)" is generated.

When code conversion routine 74 calls a function with low function call code "MON_write_REG(D1,03)," monitor control layer 61 instructs processor 33 to write data into a register and outputs the immediate value "03" to prototype 30 via serial transfer port 31, serial line 40, and dedicated terminal 39. Processor 33 writes the immediate value into the specified register "D1."

Processor 33 outputs a signal to monitor control layer 61 to indicate that the data has been written normally. Monitor control layer 61 notifies user interface layer 50 of a normal end via code conversion routine 74, command conversion routine 73, and command interpreter 72. User interface layer 50 displays a message "*VALUE 03 WAS STORED IN D1 OF TARGET1" and displays a prompt for urging the user to input a command.

Here, suppose the user inputs "setBP BP1,0x0123" on keyboard 3. User interface layer 50 transfers the input command to debug core layer 51 so that debug core layer 51 interprets and executes the command.

Command conversion routine 73 converts the command into function call code "TCI_set_BP(BP1,0x0123)" and outputs the code to code conversion routine 74. Code conversion routine 74 converts the high function call code to a low function call code specifying a target hardware environment. In this case, the hardware environment is the monitor type. Thus low function call code "MON_set_BP (BP1,0x0123)" is generated.

When code conversion routine 74 calls a function with low function call code "MON_set_BP(BP1,0x0123)," monitor control layer 61 instructs processor 33 to set breakpoint "BP1" at address "0x0123" via serial transfer port 31, serial line 40, and dedicated terminal 39. Processor 33 sets breakpoint "BP1" at address "0x0123."

Processor 33 outputs a signal to monitor control layer 61 to indicate that the breakpoint has been set normally. Monitor control layer 61 notifies user interface layer 50 of a normal end via code conversion routine 74, command conversion routine 73, and command interpreter 72.

User interface layer 50 displays a message "* BREAKPOINT BP1 WAS SET AT 0x0123 OF TARGET1" and displays a prompt for urging the user to input a command.

Here, suppose the user inputs "RUN" on keyboard 3. user interface layer 50 transfers the input command to debug core layer 51 so that debug core layer 51 interprets and executes the command.

Command conversion routine 73 converts the 1command into function call code "TCT_run(0x0000)" and outputs the code to code conversion routine 74. Code conversion routine 74 converts the high function call code to a low function call code specifying a target hardware environment. In this case, the hardware environment is the monitor type. Thus low function call code "MON_run(0x0000)" is generated.

When code conversion routine 74 calls a function with low function call code "MON_run(0x0000)," monitor control layer 61 instructs processor 33 to run debug target program 37 via serial transfer port 31, serial line 40, and dedicated terminal 39. Processor 33 runs debug target program 37.

Prototype 30 starts operating when processor 33 runs debug target program 37. When debug target program 37 stops operation at the breakpoint which has been set previously, processor 33 notifies monitor control layer 61 of the program stop via dedicated terminal 39, serial line 40, and serial transfer port 31.

Monitor control layer 61 notifies user interface layer 50 of the program stop via code conversion routine 74, command conversion routine 73, and command interpreter 72.

User interface layer 50 displays a message "*PROGRAM STOPPED AT 0x0123OF TARGET1" and displays a prompt for urging the user to input a command.

Here, suppose the user inputs "selectTARGET" on keyboard 3. The following is a description of the operation for the selectTARGET command FIGS. 13A–13F show the transportation of commands, function call codes, and state information in the layers in the debugging apparatus, as shown in FIGS. 4 and 5.

Figure 13A:
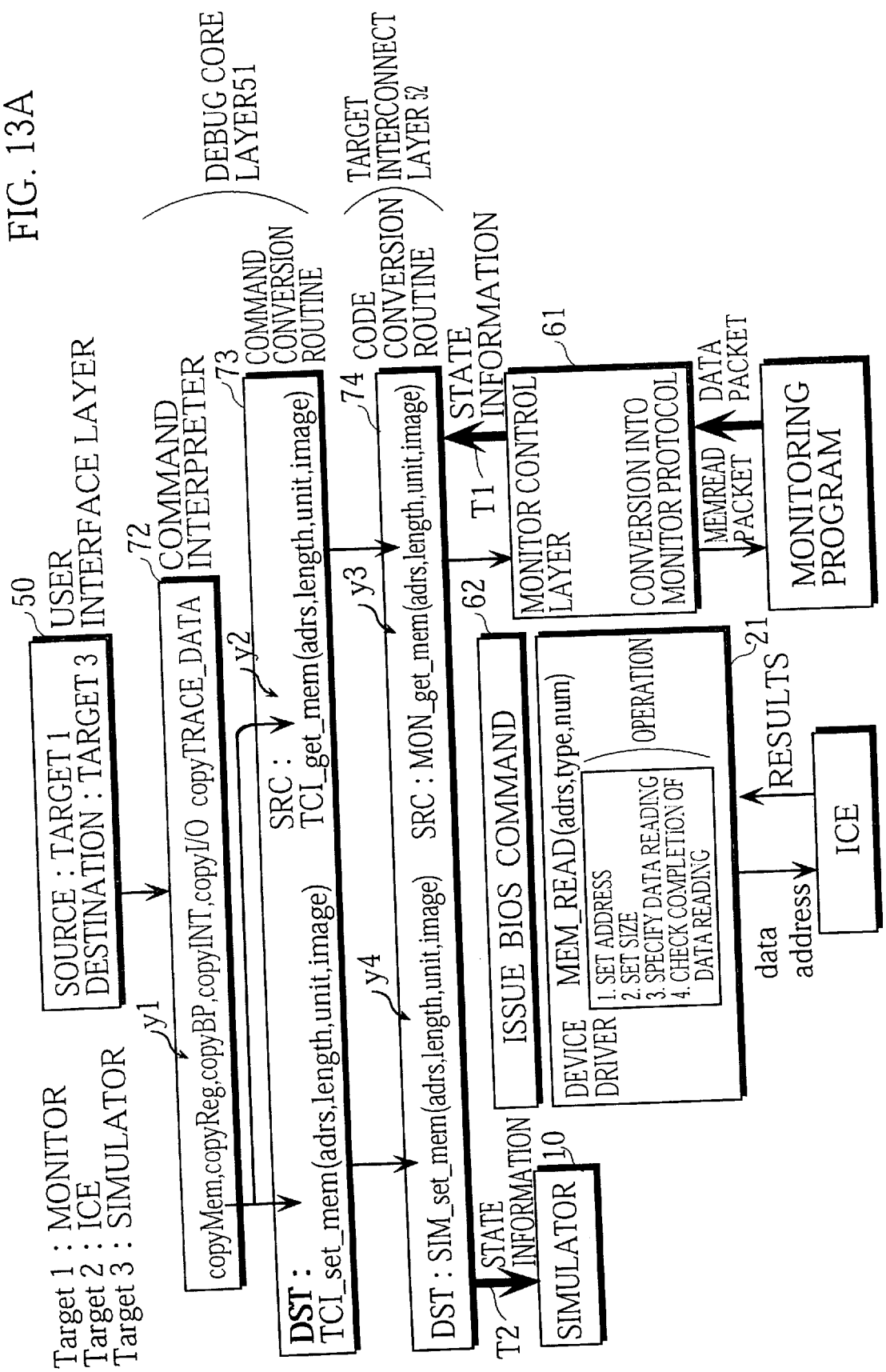
FIG. 13A shows the transportation of state information when the selectTARGET command specifying the simulator type hardware environment as the destination target hardware environment is input while the program runs in the monitor type hardware environment.

FIG. 13A shows the transportation of state information when the selectTARGET command specifying the simulator type hardware environment as the destination target hardware environment is input while the program runs in the monitor type hardware environment Each layer includes the function call codes and commands used under the condition. The arrows indicate the direction of these function call codes and commands.

The operation of command interpreter 72 related to the interpretation of the selectTARGET command is described below with reference to FIGS. 13A and 15.

It is supposed that the user inputs the selectTARGET command on keyboard 3 specifying the simulator type while the program runs in the monitor type hardware environment.

Figure 15:
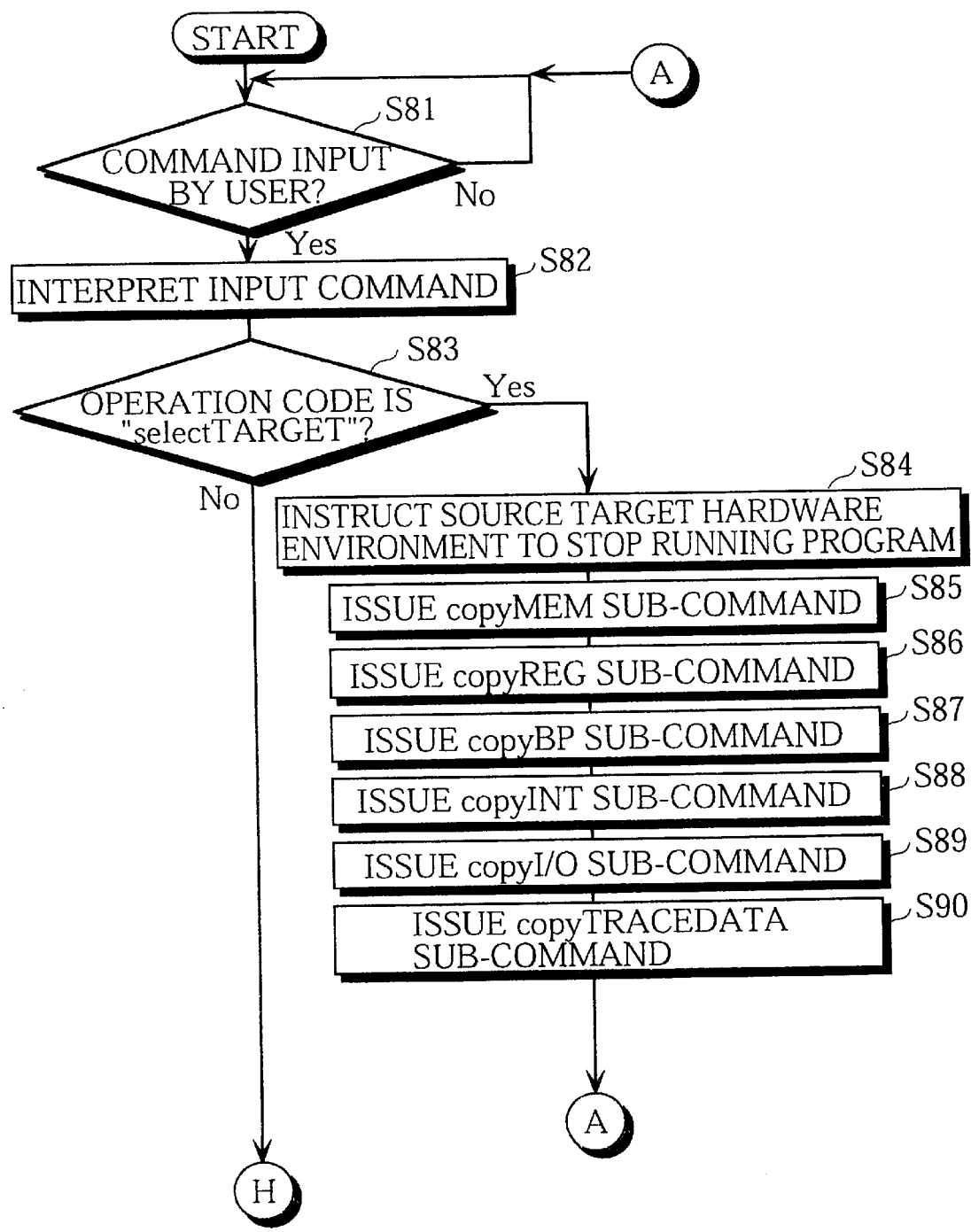
FIG. 15 is a flowchart of the procedure for the selectTARGET command in the present embodiment.

User interface layer 50 is waiting for the user to input a command by displaying a prompt, in step S81 in the flowchart of FIG. 15. When the user inputs a command, command interpreter 72 interprets the input command in step S82. command interpreter 72 then judges whether the operation code is "selectTARGET" in step S83. If it is, command interpreter 72 instructs the first hardware environment (source target hardware environment) to stop running the program. Command interpreter 72 issues subcommands copyMEM, copyREG, copyBPF, copyINT, copyI/O, and copyTRACEDATA in steps S85–S90, respectively (see arrow y1 in FIG. 13A).

Command conversion routine 73 converts, for example, sub-command "copyMEM" into two high function call codes: "TCI get_mem(adr,length, unit,image)" and "TCI_set_mem(adr,length, unit,image)" (see arrow y2 in FIG. 13A). command conversion routine 73 also converts, for example, sub-command "mcopyREG" into two high function call codes: "TCI_get_reg(regs,mask)" and "TCI_set_reg(regs,mask)."

Code conversion routine 74 converts the high function call codes to low function call codes specifying target hardware environments.

In this case, the source target hardware environment is the monitor type and the destination target hardware environment is the simulator type. Thus low function call codes "MON_get_mem(adr,length,unit,image)" and "SIM_set mem(adr,length,unit,image)" are generated (see arrows y3 and y4 in FIG. 13A). Code conversion routine 74 calls functions with the low function call codes.

When code conversion routine 74 calls a function with low function call code "MON_get_mem(adr,length,unit, image)," monitor control layer 61 is activated. Monitor control layer 61 reads data from prototype 30 one byte by one byte via serial transfer port 31, serial line 40, and dedicated terminal 39, as shown in the flowchart of FIG. 11A. Monitor control layer 61 accumulates the read data in an area of shared work area 77 specified by argument "image." When monitor control layer 61 repeats this process n times as specified by field "SIZE," data with the length specified by argument "length" has been stored in the area of shared work area 77 specified by argument "image" (see arrow T1 in FIG. 13A).

When code conversion routine 74 calls a function with low function call code "SIM_set_mem(adr,length,unit, image)," monitor control layer 61 transfers data, as the state information, from an area in shared work area 77 specified by argument "image" to an area in memory simulation routine 96 specified by argument "adr" (see arrow T2 in FIG. 13A).

The above process is repeated for each of the other sub-commands: copyREG, copyBP, COpyINT, copyI/O, and copyTRACE_DATA. When this completes, the operation states stored in the storages of prototype 30 have been transferred to simulator 10. This indicates that the state information has been transferred from prototype 30 to simulator 10 and that simulator 10 has succeeded the operation of prototype 30. Simulator 10 resumes the operation of the program with the succeeded operation state information.

Figure 13B:
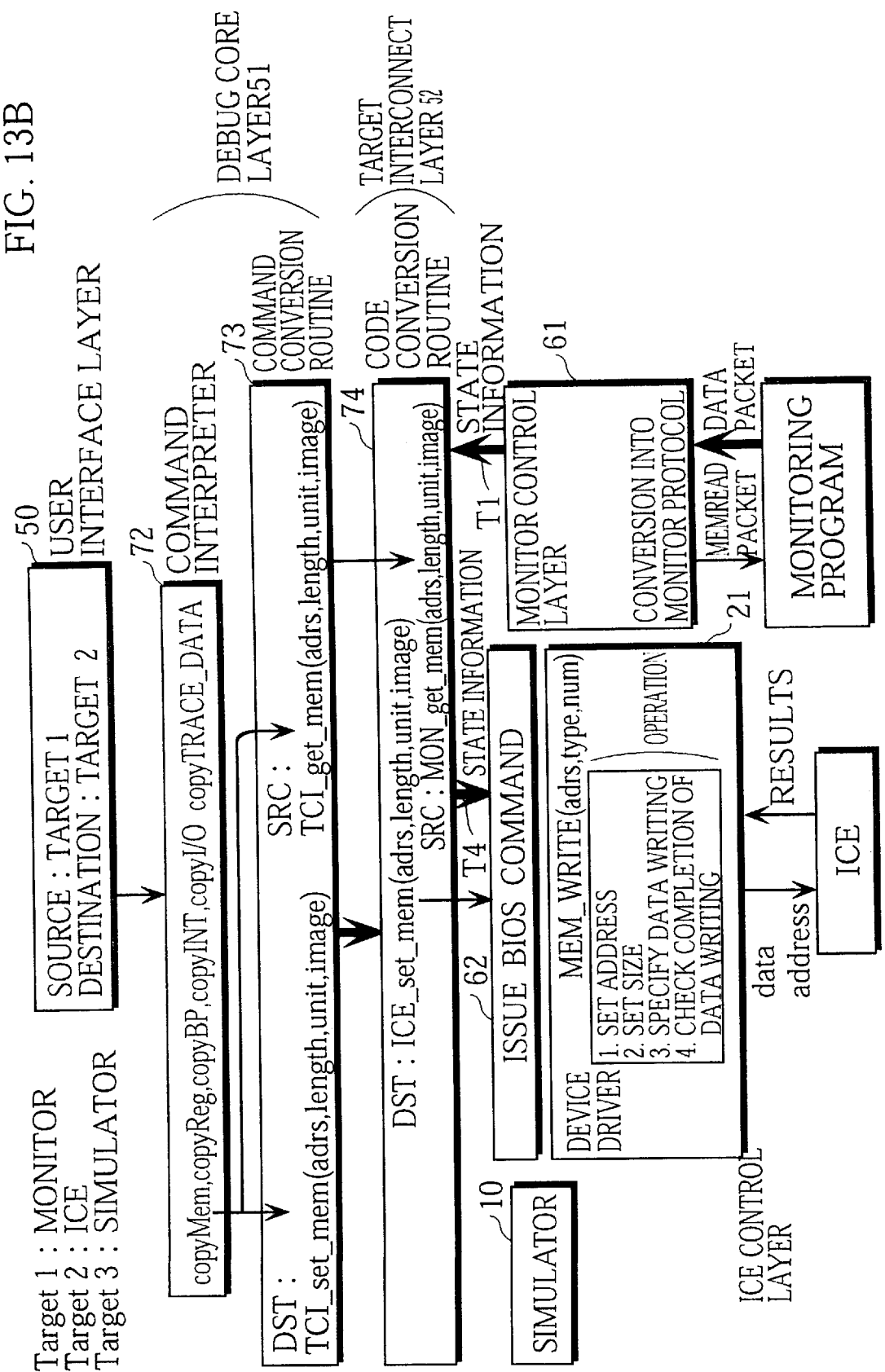
FIG. 13B shows the transportation of state information when the selectTARGET command specifying the ICE type is input while the program runs in the monitor type hardware environment.

FIG. 13B shows the transportation of state information when the selectTARGET command specifying the ICE type is input while the program runs in the monitor type hardware environment. When code conversion routine 74 generates low function call code "ICE_set_mem(adr,length, unit, image)," ICE control layer 62 is activated. ICE control layer 62 issues the BIOS command to transfer the state information from an area specified by argument "image" to evaluation board 20 (see arrow T4 in FIG. 13B). This indicates that the state information has been transferred from prototype 30 to evaluation board 20 and that evaluation board 20 has succeeded the operation of prototype 30.

Figure 13C:
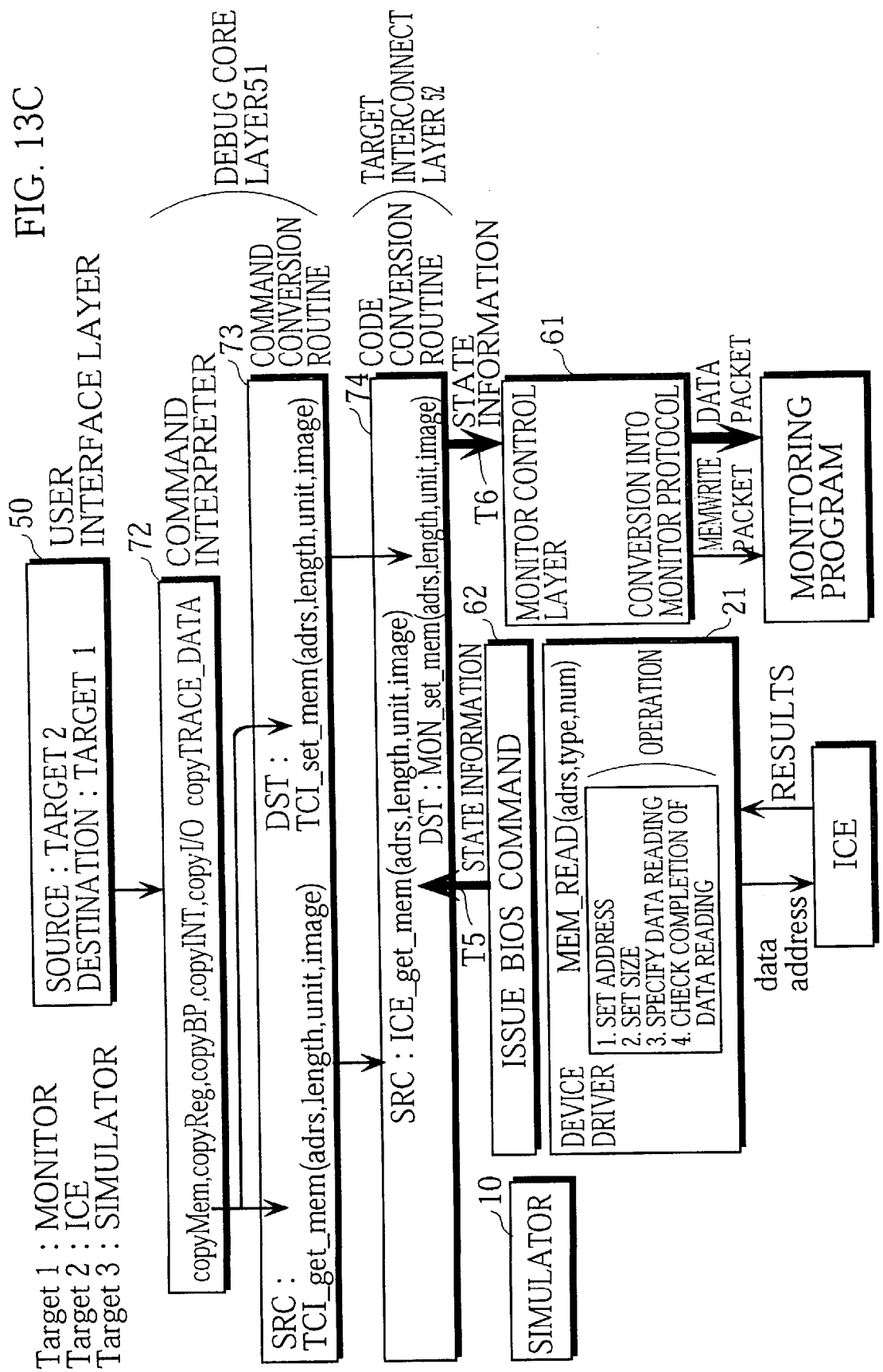
FIG. 13C shows the transportation of state information when the selectTARGET command specifying the monitor type is input while the program runs in the ICE type hardware environment.

FIG. 13C shows the transportation of state information when the selectTARGET command specifying the monitor type is input while the program runs in the ICE type hardware environment. When code conversion routine 74 generates low function call code "ICE_get_mem(adr, length, unit,image)," ICE control layer 62 is activated. ICE control layer 62 transfers the state information from evaluation board 20 to an area specified by argument "image" (see arrow T5 in FIG. 13C).

When code conversion routine 74 generates low function call code "MON_set_mem(adr,length,unit,image)," monitor control layer 61 is activated. Monitor control layer 61 transfers the data from the area specified by argument "image" to prototype 30 via serial line 40 (see arrow T6 in FIG. 13C). This indicates that the state information has been transferred from evaluation board 20 to prototype 30 and that prototype 30 has succeeded the operation of evaluation board 20.

Figure 13D:
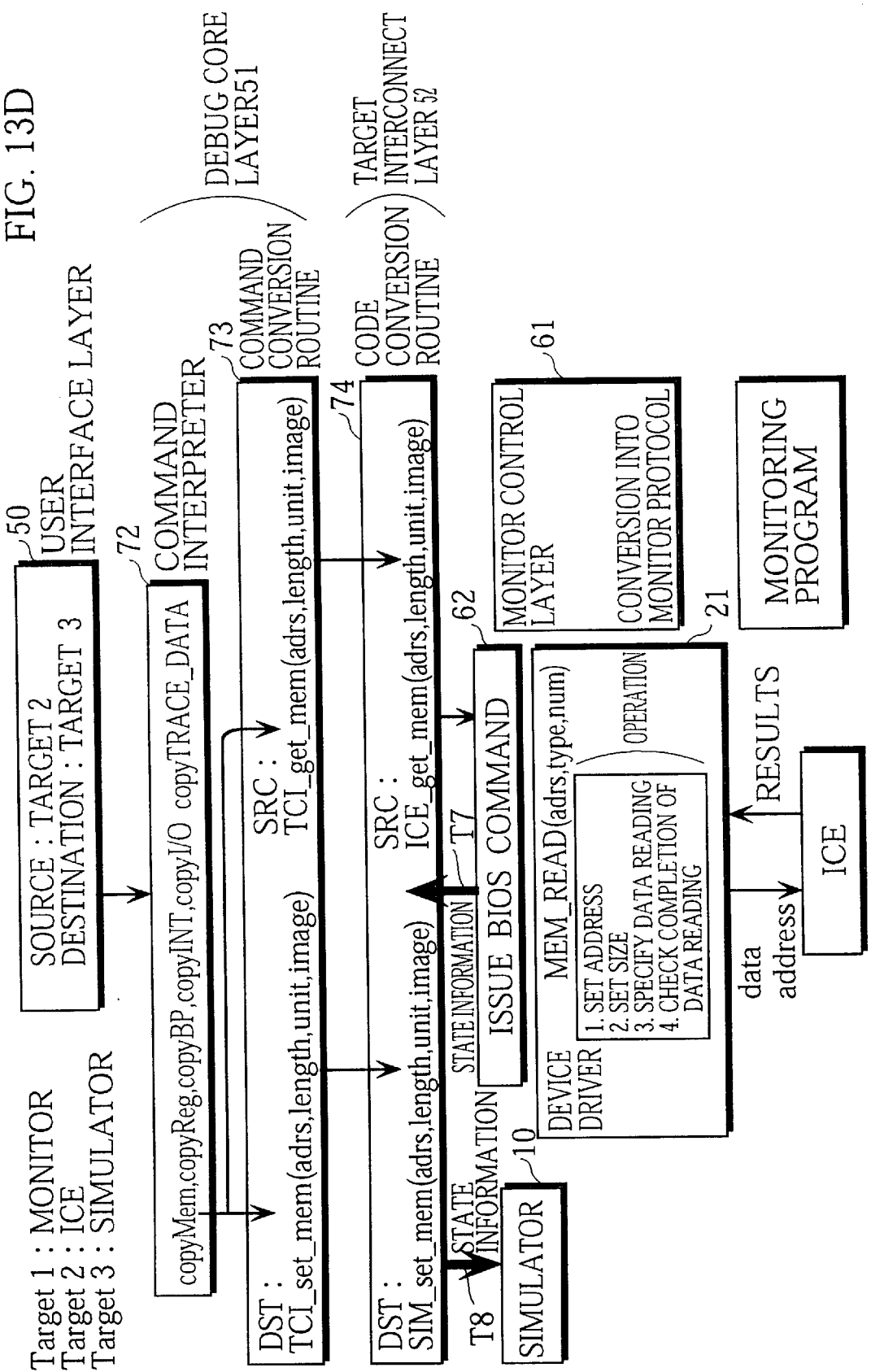
FIG. 13D shows the transportation of state information when the selectTARGET command specifying the simulator type is input while the program runs in the ICE type hardware environment.

FIG. 13D shows the transportation of state information when the selectTARGET command specifying the simulator type is input while the program runs in the ICE type hardware environment. When code conversion routine 74 generates low function call code "ICE_get_mem(adr, length,unit,image)," ICE control layer 62 is activated. ICE control layer 62 transfers the state information from evaluation board 20 to an area specified by argument "image" (see arrow T7 in FIG. 13D).

When code conversion routine 74 generates low function call code "SIM_set_mem(adr,length,unit,image)," simulator 10 is activated. Simulator 10 transfers the data from the area specified by argument "image" to memory simulation routine 96 (see arrow T8 in FIG. 13D). This indicates that the state information has been transferred from evaluation board 20 to simulator 10 and that simulator 10 has succeeded the operation of evaluation board 20.

Figure 13E:
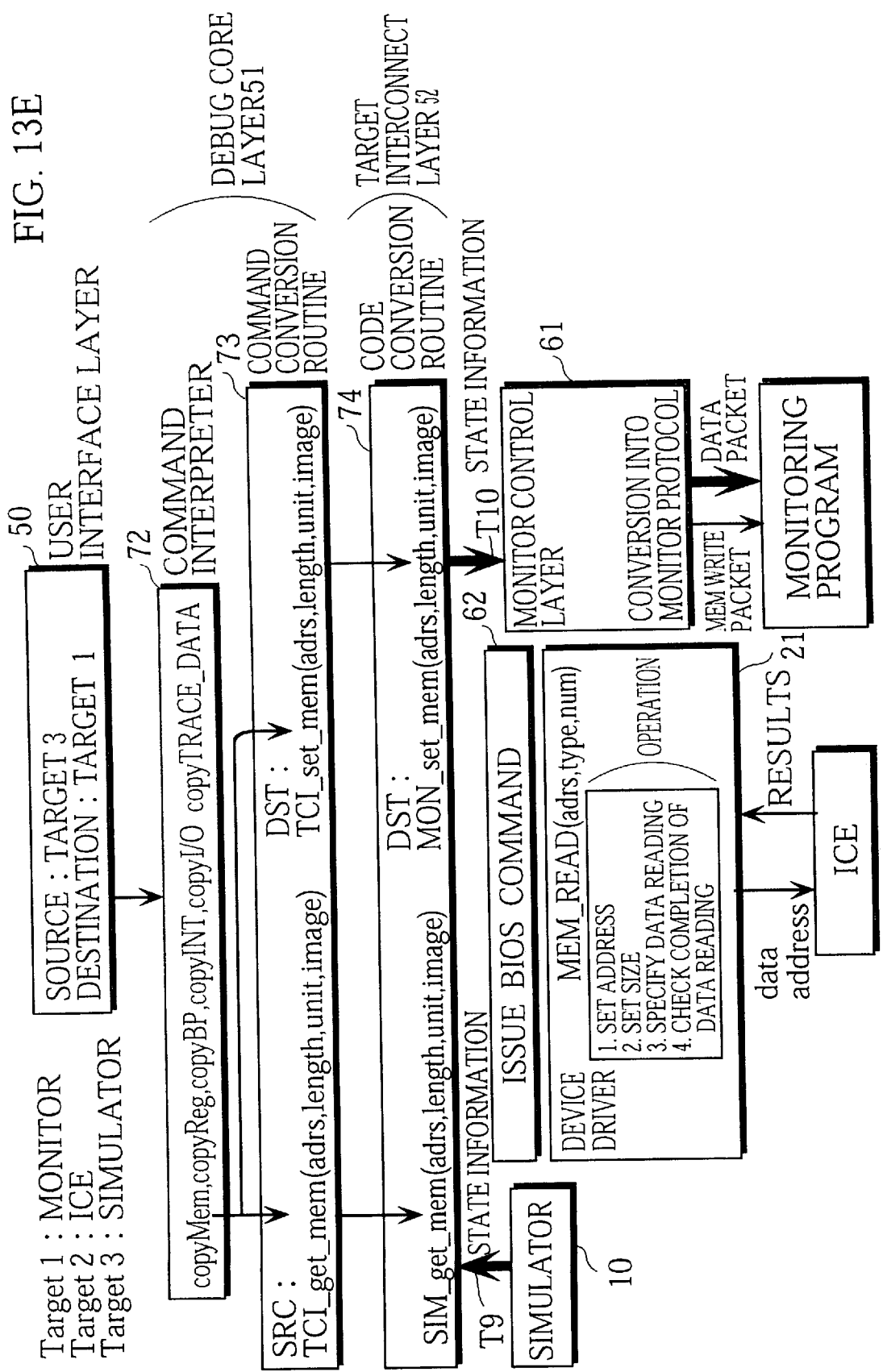
FIG. 13E shows the transportation of state information when the selectTARGET command specifying the monitor type is input while the program runs in the simulator type hardware environment.

FIG. 13E shows the transportation of state information when the selectTARGET command specifying the monitor type is input while the program runs in the simulator type hardware environment. When code conversion routine 74 generates low function call code "SIM_get_mem(adr, length,unit,image)," simulator 10 is activated. Simulator 10 writes the state information of itself into an area of shared work area 77 specified by argument "image" (see arrow T9 in FIG. 13E).

When code conversion routine 74 generates low function call code "MON_get_mem(adr,length,unit,image)," monitor control layer 61 is activated. Monitor control layer 61 transfers the data from the area specified by argument "image" to prototype 30 (see arrow T10 in FIG. 13E). This indicates that the state information has been transferred from simulator 10 to prototype 30 and that prototype 30 has succeeded the operation of simulator 10.

FIG. 13F shows the transportation of state information when the selectTARGET command specifying the ICE type is input while the program runs in the simulator type hardware environment. When code conversion routine 74 generates low function call code "SIM_get_mem(adr, length,unit,image)," simulator 10 is activated. Simulator 10 writes the state information of itself into an area of shared work area 77 specified by argument "image" (see arrow T11 in FIG. 13F).

When code conversion routine 74 generates low function call code "ICE_set_mem(adr,length,unit,image)," ICE. control layer 62 is activated. ICE control layer 62 transfers the data from the area specified by argument "image" to evaluation board 20 (see arrow T12 in FIG. 13F). This indicates that the state information has been transferred from simulator 10 to evaluation board 20 and that evaluation board 20 has succeeded the operation of simulator 10.

Arbitrary switching between the monitor type, ICE type, and simulator type hardware environments is achieved b the above described transportation of the state information.

The following is a description of work area analysis module 75, which is a component of target interconnect layer 52.

Work area analysis module 75 includes a breakpoint management function, a trace data accumulation size management function, an interrupt generation condition management function, and an I/O mapping information management function. The breakpoint management function manages the memories of the hardware environments by dividing each memory into areas in which breakpoints can be set and areas in which breakpoints cannot be set. The trace data accumulation size management function manages, for each hardware environment, the sizes of the areas in which breakpoints can be set. The interrupt generation condition management function manages each hardware environment whether it has an ability to monitor whether an interrupt generation condition has been satisfied. The I/O mapping information management function manages the I/O mapping information.

Work area analysis module 75 includes the breakpoint management function to deal with a case where description forms of interrupt instruction for setting breakpoint differ among the monitor type, ICE type, and simulator type. If a breakpoint is set in RAM in the source target hardware environment and the RAM corresponds to a ROM in the destination target hardware environment, for example, it is impossible to set the breakpoint in the destination target hardware environment. If the user does not know this fact in advance, the user will be embarrassed at a phenomenon in which a breakpoint becomes ineffective when the user switches the hardware environments. When this happens, the user may think this phenomenon as an error. Therefore, it is necessary for work area analysis module 75 to have a function to manage the memories of the hardware environments by dividing each memory into areas in which breakpoints can be set and areas in which breakpoints cannot be set.

FIG. 14D shows information used for the breakpoint management function. The information includes: labels of the areas in which breakpoints can be set (e.g. VALID_AREA1), and the start and end addresses of the areas.

Work area analysis module 75 includes the trace data accumulation size management function to deal with a case where the memory sizes for the trace data differ among the monitor type, ICE type, and simulator type. If the source target hardware environment is simulator type and the destination target hardware environment is monitor type, for example, it is impossible to transfer all the trace data accumulated in the source target hardware environment to the destination target hardware environment. This is because the memory of the destination target hardware environment goes short of space for storing the trace data. When this happens, a part of the trace data is lost. If the user does not know this fact in advance, the user will be embarrassed at a phenomenon in which a part of the trace data is lost. Therefore, it is necessary for work area analysis module 75 to have a function to manage, for each hardware environment, the sizes of the areas in which breakpoints can be set.

FIG. 14E shows information used for the trace data accumulation size management function. The information includes identification names (e.g. target1) for the hardware environments, and the maximum sizes of the memory areas in which breakpoints can be set.

Work area analysis module 75 included the interrupt generation condition management function to deal with a case where some hardware environments may have an ability to monitor whether an interrupt generation condition has been satisfied and other hardware environment may not have such an ability. If the source target hardware environment is simulator type and the destination target hardware environment is monitor type, for example, the source target hardware environment may have such an ability since instruction executions can be counted by software; it is difficult for the destination target hardware environment to have such an ability unless the hardware construction is modulated for this purpose. Thus, the destination target hardware environment may not recognize the fulfilment of the interrupt generation condition. If the user does not know this fact in advance, the user will be embarrassed. Therefore, it is necessary for work area analysis module 75 to have a function to manage each hardware environment whether it has an ability to monitor whether an interrupt generation condition has been satisfied.

FIG. 14F shows information used for the interrupt generation condition management function. The information includes identification names (e.g. target1) for the hardware environments and indicates whether the hardware environment can count the number of instruction executions (cycles). "VALID" in the drawing indicates that the hardware environment can count the number of instruction executions; "INVALID" indicates that the hardware environment cannot count the number of instruction executions.

Work area analysis module 75 includes the I/O mapping information management function to deal with a case where the number of effective peripheral I/O registers differs among the monitor type, ICE type, and simulator type. If the source target hardware environment is the monitor type and destination target hardware environment is simulator type, for example, only a part of the peripheral I/O registers are available in the source target hardware environment due to slow adjustment of the hardware environment; all the peripheral I/O registers are available in the destination target hardware environment since the hardware environment is simulated by software under such a condition, invalid values may be stored in the peripheral I/O registers or the destination target hardware environment. Therefore, it is necessary for work area analysis module 75 to have a function to manage the effective I/O registers for each hardware environment.

FIG. 14G shows I/O mapping information used for the I/O mapping information management function. The I/O mapping information indicates values to be set in the peripheral I/O registers of the destination target hardware environment when the corresponding peripheral I/O registers of the source target hardware environment do not have values. "I/O REGISTER_ADDR1," for example, indicates the first peripheral I/O register, "PSW=STATUS1 0x1F" indicates that value "0x1F" should be set in the first peripheral I/O register when the PSW register of the processor in the destination target hardware environment stores value "STATUS1," "PSW-STATUS2 0x2A" indicates that value "0x2A" should be set in the first peripheral I/O register when the PSW register stores value "STATUS2," and "PSW= STATUS3 0x3B" indicates that value "0x3B" should be set in the first peripheral I/O register when the PSW register stores value "STATUS3."

The following is a description of the extended selectTARGET commands.

FIG. 6B shows three major examples of the extended selectTARGET commands. The extension of a selectTARGET command is achieved by assigning a certain condition to the issue of the selectTARGET command. The three extended selectTARGET commands of FIG. 6B have different conditions.

The IFbreak command instructs the source target hardware environment to run the debug target program, and issues the selectTARGET command when the execution of the program stops at the breakpoint specified by operand "breakNo."

The targetASSIGN command allows a table specified by operand "table*" be resident in the source target hardware environment, instructs the source target hardware environment to run the debug target program, and issues the selectTARGET command based on the table. FIG. 6C shows the table. As shown in the drawing, the areas each of which is ranging the first address to the end address have corresponding destination target hardware environments.

The switch command switches the hardware environments according to the value of variable "var." In the present embodiment, the switch command has two option cases: case '*1' for variable value "*1" and case '*2' for variable value "*2." In the present case, if the variable value is "*1," hardware environment "target1" is activated; if the variable value is "*2," hardware environment "target2" is activated.

Figure 16:
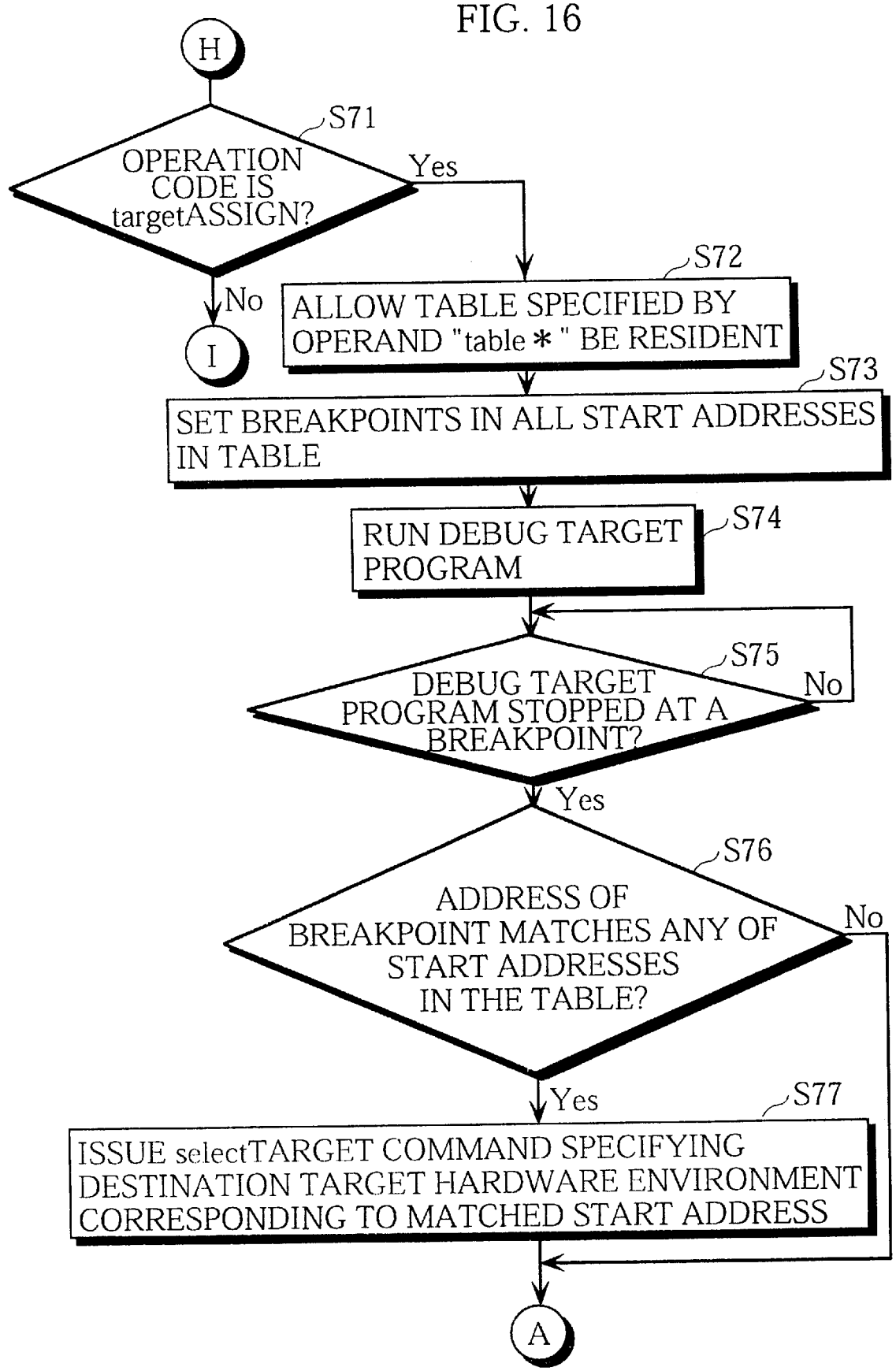
FIG. 16 is a flowchart of the procedure for the targetASSIGN command in the present embodiment.
Figure 17:
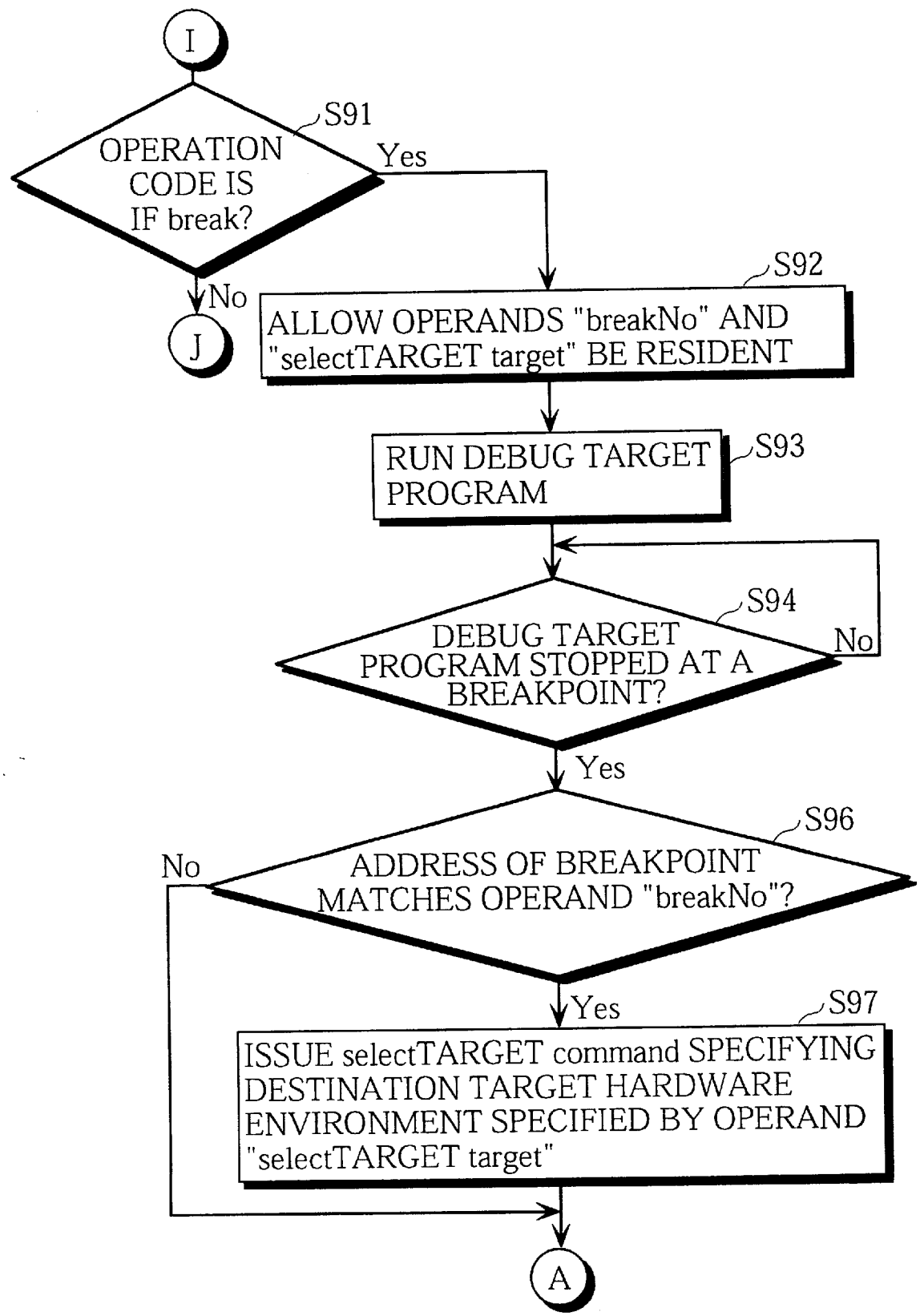
FIG. 17 is a flowchart of the procedure for the IFbreak command in the present embodiment.
Figure 18:
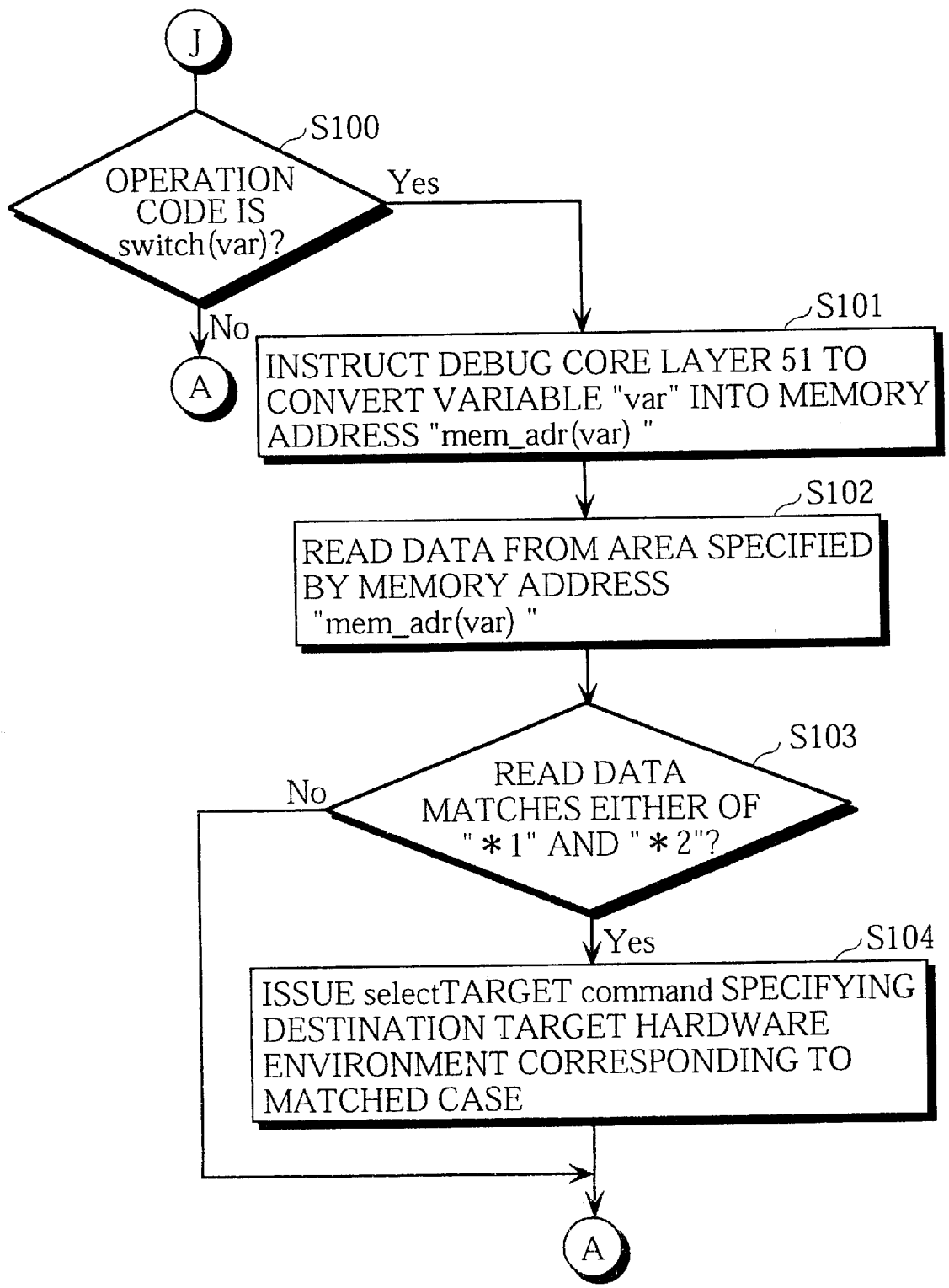
FIG. 18 is a flowchart of the procedure for the switch(var) command in the present embodiment.

The operation procedure of command interpreter 72 for each of the three extended selectTARGET command is described below with reference to the flowcharts of FIGS. 16–18.

Suppose the user inputs the targetASSIGN command into user interface layer 50. Control goes to step S71 of the flowchart of FIG. 16 via step S83 of FIG. 15. Command interpreter 72 judges in step S71 whether the operation code is "targetASSIGN." In this case, it is judged as yes. command interpreter 72 allows a table specified by operand "table*" be resident in the source target hardware environment in step S72. Command interpreter 72 then sets breakpoints in all the start addresses in the table, in step S73. Command interpreter 72 runs the debug target program in step S74. Command interpreter 72 monitors the debug target program to see if it has stopped at a breakpoint (step S75). If such a stop is detected, command interpreter 72 checks to see whether the address of the breakpoint matches any of the start addresses in the table (step S76). If matches, command interpreter 72 issues the selectTARGET command specifying the destination target hardware environment corresponding to the matched start address.

Suppose the user inputs the IFbreak command into user interface layer 50. Command interpreter 72 judges in step S83 in the flowchart of FIG. 15 that the operation code is not "SelectTARGET." Control then goes to step S71 of the flowchart of FIG. 16, and command interpreter 72 judges that the operation code is not "targetASSIGN." Control then goes to step 591 of the flowchart of FIG. 17. Command interpreter 72 judges in the step whether the operation code is "IFbreak." In this case, it is judged as yes. Command interpreter 72 allows operands "breakNo" and "selectTARGETtarget" be resident in the source target hardware environment in step S92. Command interpreter 72 runs the debug target program in step S93. Command interpreter 72 monitors the debug target program to see if it has stopped at a breakpoint (step S94). If such a stop is detected, command interpreter 72 checks to see whether the address of the breakpoint matches operand "breakNo" (step S96). If matches, command interpreter 72 issues the selectTARGET command specifying the destination target hardware environment which is specified by operand "selectTARGETtarget" (step S97).

Suppose the user inputs the switch(var) command into user interface layer 50. Command interpreter 72 passes through steps S83, S71, and S91 with "no." command interpreter 72 judges in step S100 in the flowchart of FIG. 18 whether the operation code is "switch(var)." In this case, it is judged as yes. Command interpreter 72 instructs debug core layer 51 to convert variable "var" into a memory address "mem_adr(var)" in step S101. Command interpreter 72 reads data from an area specified by memory address "mem_adr(var)" in stop S102. Command interpreter 72 judges whether the read data matches either of "*1" and "*2" in step S103. If it matches, command interpreter 72 issues the selectTARGET command specifying the destination target hardware environment ("target1" or "target2") which corresponds to the matched value, namely, "*1" or "*2"(step S104).

As will be understood from the above description, the present embodiment enables the operator to switch the hardware environments at any state of debugging with a simple procedure, that is, by issuing the selectTARGET command. That means the operator can analyze the cause of bugs in another hardware environment without a trouble reproducing the same situation. This allows the operator to effectively use the time for developing products.

The above advantage is remarkable when bugs are found in a hardware environment, such as the monitor type, which has poor analysis functions since the hardware environment can be changed to another hardware environment with affluent analysis functions, such as the ICE type and the simulator type.

The above environment shows only one example of systems which displays best effects currently available. The present invention can be changed or modified unless such changes and modifications depart from the scope of the present invention, that is, as long as the invention includes a simple change between the hardware environments. The following are examples of such modifications.

(a) In the present embodiment, the supervisor program is stored in a memory. The supervisor program, however, may be included in debug core layer 51. Alternately, target interconnect layer 52 may be included in debug core layer 51.

(b) In the present embodiment, it is assumed that the setting of breakpoints, trace data, and interrupts are available in the destination target hardware environment. However, in case any of such functions are not possible in the destination target hardware environment, certain functions that are available may be specified.

(c) In the present embodiment, all the contents of work area 38 are transferred to the destination target hardware environment. However, only a changed part of previously transferred data may be transferred. This will lessen tho load of transfer. To achieve this, the data in the stack area and the external variable area is stored in debug core layer 51 or target interconnect layer 52 as a backup. When the selectTARGET command is issued, data to be transferred is compared with the backup, and only a changed part is transferred to the destination target hardware environment. The changed part or data including the changed part may be stored in a storage.

(d) A changed part of data may be transferred to other hardware environments each time the data is changed. In such a case, the hardware environments are changed with higher speed since it is not necessary to transfer data from memory to memory.

(e) In the present embodiment, all the values of registers are transferred to the destination target hardware environment. However, only changed values of registers may be transferred. In such a case, the hardware environments are changed with higher speed since it is not necessary to transfer values of all the registers.

(f) The "area break" may be used if this function is available in the target hardware environments. With the area break, an area can be specified as the breakpoint.

(g) In the present embodiment, a command for switching the hardware environments according to the value of a variable is described. There may be used a command, instead of the above command, for switching the hardware environments according to the value of a parameter.

(h) A command may be used in which the change of the hardware environments, the generation of an interrupt signal, and the state or the destination target hardware environment are specified. By issuing such a command, the debug target program may be monitored in the destination target hardware environment for a specified interrupt in a specified state.

(i) A command may be used in which the change of the hardware environments, the first and the second destination target hardware environments, the change of the contents of a certain memory or a certain register, and the monitoring of the memory or register are specified. By issuing such a command, the debug target program may be monitored when the contents of the memory or register are changed in a specified hardware environment.

(j) A command including a table may be used in which the change of the hardware environments is specified, where the table shows a plurality of hardware environments and corresponding scheduled execution times. By issuing such a command, the debug target program may be monitored in specified hardware environments at specified execution times.

(k) In the present embodiment, the debug is stored in memory 24 and memory simulation routine 96. However, the debug information may be held in debug core layer 51 and target interconnect layer 52. With such an arrangement, it is virtually unnecessary to read the debug information from monitor control layer 61, ICE control layer 62, and simulator 10 of target dependent layer 53. It is also unnecessary for command conversion routine 73 to issue function call codes "TCI_get_mem, "TCI_get_reg," and "TCI_get_BP." Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A debugging apparatus operably connected to a target machine and an emulator machine emulating the target machine, and a simulator simulating the target machine in terms of software, wherein a program, which is to be embedded into the target machine, runs in the target machine, the emulator machine, and the simulator, and each of the target machine, the emulator machine, and the simulator includes operation state information which indicates an operation state of the program for that environment and inputs and outputs the operation state information in a form unique to each of the target machine, the emulator machine, and the simulator, the debugging apparatus comprising:

target environment storing means for storing information of a target environment which is an identification name of any of the target machine, the emulator machine, and the simulator in which the program is running;

receiving means for receiving a command input by an operator;

instruction detecting means for judging whether a certain instruction is included in the command received by the receiving means;

specifying means for, when the instruction detecting means judges that the certain instruction is included in the command, specifying a target environment specified by the identification name stored in the target environment storing means as a source target environment and for specifying, as a destination target environment, one of the target machine, the emulator machine, and the simulator other than the identification name stored in the target environment storing means;

operation halting means for halting operation of the program in the source target environment when the specifying means specifies the source target environment and the destination target environment;

reading means for reading operation state information for the source target environment;

converting means for converting the operation state information read by the reading means into operation state information written in a form unique to the destination target environment;

setting means for setting the operation state information written in the form unique to the destination target environment in the destination target environment; and operation resuming means for resuming an operation of the program in the destination target environment.

2. The debugging apparatus of claim 1, wherein the target machine inputs and outputs the operation state information in a first form, the emulator machine inputs and outputs the operation state information in a second form, and the simulator inputs and outputs the operation state information in a third form, wherein the converting means includes:

a first converting unit for converting the operation state information from the first form to the third form when the source target environment is the target machine and the destination target environment is the simulator; and a second converting unit for converting the operation state information from the second form to the third form when the source target environment is the emulator machine and the destination target environment is the simulator, wherein the setting means includes:

a first setting unit for setting the operation state information in the simulator after the operation state information has been converted into the third form.

3. The debugging apparatus of claim 2, wherein the converting means includes:

a third converting unit for converting the operation state information from the third form to the first form when the source target environment is the simulator and the destination target environment is the target machine; and a fourth converting unit for converting the operation state information from the third form to the second form when the source target environment is the simulator and the destination target environment is the emulator machine, wherein the setting means includes:

a second setting unit for setting the operation state information in the target machine after the operation state information has boon converted into the first form; and a third setting unit for setting the operation state information in the emulator machine after the operation state information has been converted into the second form.

4. The debugging apparatus of claim 3, wherein the converting means includes:

a first controlling unit for instructing the first converting unit to convert the operation state information from the first form to the third form when the source target environment is the target machine and the destination target environment is the emulator machine, then instructing the fourth converting unit to convert the operation state information from the third form to the second form; and a second controlling unit for instructing the second converting unit to convert the operation state information from the second form to the third form when the source target environment is the emulator machine and the destination target environment is the target machine, then instructing the third converting unit to convert the operation state information from the third form to the first form.

5. The debugging apparatus of claim 4 further comprising:
a serial transfer port for inputting and outputting the operation state information of the first form from and to a processor included in the target machine, wherein the serial transfer port is connected to the processor via a first line; and
a device driver for inputting and outputting the operation state information of the second form from and to an in circuit emulator included in the emulator machine, wherein the device driver is connected to the in circuit emulator via a second line.

6. The debugging apparatus of claim 5, wherein
the operation state information is composed of information stored in a register and a memory of the source target environment.

7. The debugging apparatus of claim 6, wherein
the target machine, the emulator machine, and the simulator are also called target environments, wherein
the information stored in the memory is one of:
  a breakpoint for instructing the processor to stop operating;
  trace data which is composed of at least an address of a an instruction in the program which has been executed; and
  interrupt setting information for generating an interrupt signal when a certain condition set by the operator is satisfied.

8. The debugging apparatus of claim 7 further comprising:
storage managing means for managing memories and registers of the target machine, the emulator machine, and the simulator by classifying the memories and the registers into memories and registers storing effective values and memories and registers storing ineffective values; and
rewriting means for converting ineffective values included in operation state information into default values by referring to the storage managing means when the operation state information is read from the source target environment by the reading means, wherein
  the converting means converts the operation state information into a form of the destination target environment after the rewriting means has converted the ineffective values into the default values.

9. The debugging apparatus of claim 7 further comprising:
breakpoint setting managing means for managing areas of the memories and the registers of the target machine, the emulator machine, and the simulator by classifying the areas into areas for which a breakpoint can be set and areas for which a breakpoint cannot be set;
judging means for judging whether a breakpoint is to be set in the destination target environment by referring to the breakpoint setting managing means after the converting means has converted the operation state information into the form of the destination target environment; and
notifying means for notifying the operator that the breakpoint is not to be set in the destination target environment when the judging means judges that the breakpoint is not to be set in the destination target environment.

10. The debugging apparatus of claim 7 further comprising;
maximum value storing means for storing a value representing the maximum number of accumulated addresses for each of the target machine, the emulator machine, and the simulator;
address number recognizing means for recognizing a current number of accumulated addresses in the destination target environment; and
notifying means for notifying the operator of a difference between the current number of accumulated addresses and the maximum number of accumulated addresses.

11. The debugging apparatus of claim 7 further comprising:
interrupt generation managing means for managing the target environments by classifying the target environments into ones which monitor a satisfaction of an interrupt generation condition and ones which do not monitor the satisfaction of the interrupt generation condition;
judging means for judging whether the destination target environment monitors the satisfaction of the interrupt generation condition by referring to the interrupt generation managing means after the converting means has converted the operation state information into the form of the destination target environment; and
notifying means for notifying the operator that the destination target environment does not monitor the satisfaction of the interrupt generation condition when the judging means judges that the destination target environment does not monitor the satisfaction of the interrupt generation condition.

12. The debugging apparatus of claim 7 further comprising:
first interpreting means for interpreting an instruction of monitoring a generation of an interrupt signal when the instruction detecting means judges that the certain instruction is not included in the command received by the receiving means, the instruction being included in the command received by the receiving means;
second interpreting means for interpreting an identification number of an interrupt signal and a corresponding destination target environment, the identification number and the corresponding destination target environment being included in the command received by the receiving means;
monitoring means for monitoring the generation of the interrupt signal in the source target environment; and
judging means for, when an interrupt signal is generated, judging whether an identification number of the generated interrupt signal matches the identification number interpreted by the second interpreting means, wherein
  the reading means reads the operation state information from the source target environment when the judging means judges that the identification number of the generated interrupt signal matches the identification number interpreted by the second interpreting means.

13. The debugging apparatus of claim 7 further comprising:

first interpreting means for interpreting an instruction of monitoring a rewriting of one of a certain memory and a certain register when the instruction detecting means judges that the certain instruction is not included in the command received by the receiving means, the instruction being included in the command received by the receiving means;

second interpreting means for interpreting an instruction or changing a current target environment to another target environment in case one of the certain memory and the certain register is rewritten, the instruction being included in the command received by the receiving means; and monitoring means for monitoring the rewriting of one of the certain memory and the certain register, wherein
the reading means reads the operation state information from the source target environment, wherein
the converting means converts the operation state information into the form of the destination target environment which is the other target environment interpreted by the second interpreting means.

14. The debugging apparatus of claim 7 further comprising:

first interpreting means for interpreting an instruction of changing target environments when the instruction detecting means judges that the certain instruction is not included in the command received by the receiving means, the instruction being included in the command received by the receiving means;

second interpreting means for interpreting a table which shows relation between a plurality of parts of the program and corresponding target environments, the table being included in the command received by the receiving means;

third interpreting means for interpreting an instruction of monitoring a change of currently executed part of the program, the instruction being included in the command received by the receiving means; and monitoring means for monitoring the change of currently executed part of the program in the source target environment, wherein
the specifying means includes:
a destination specifying unit for specifying a destination target environment when the monitoring means detects the change or currently executed part by referring to the table interpreted by the second interpreting means, wherein
the reading means reads the operation state information from the source target environment when the destination specifying unit specifies the destination target environment.

15. the debugging apparatus of claim 7 further comprising:

first interpreting means for interpreting an instruction of changing target environments when the instruction detecting means judges that the certain instruction is not included in the command received by the receiving means, the instruction being included in the command received by the receiving means;

second interpreting means for interpreting a table which shows relation between a plurality of variable values, a plurality of values which can be stored in one of a memory and a register, and corresponding target environments, the table being included in the command received by the receiving means;

third interpreting means for interpreting an instruction of monitoring a change of a certain variable of the program, the instruction being included in the command received by the receiving means; and monitoring means for monitoring the change of the certain variable of the program in the source target environment, wherein
the specifying means includes:
a destination specifying unit for specifying a destination target environment when the monitoring means detects the change of the certain variable by referring to the table interpreted by the second interpreting means, wherein
the reading means reads the operation state information from the source target environment when the destination specifying unit specifies the destination target environment.

16. The debugging apparatus of claim 7 further comprising:

first interpreting means for interpreting a table which shows relation between a plurality of parameters, a plurality of parts of the program, and corresponding target environments when the instruction detecting means judges that the certain instruction is not included in the command received by the receiving means, the table being included in the command received by the receiving means;

second interpreting means for interpreting an instruction of monitoring a change of a certain parameter of the program, the instruction being included in the command received by the receiving means; and monitoring means for monitoring the change of the certain parameter of the program in the source target environment, wherein
the specifying means includes:
a destination specifying unit for specifying a destination target environment when the monitoring means detects the change of the certain parameter by referring to the table interpreted by the first interpreting means, wherein
the reading means reads the operation state information from the source target environment when the destination specifying unit specifies the destination target environment.

17. The debugging apparatus of claim 7 further comprising:

first interpreting means for interpreting a table which shows relation between a plurality of target environments and corresponding scheduled execution times when the instruction detecting means judges that the certain instruction is not included in the command received by the receiving means, the table being included in the command received by the receiving means; and time measuring means for measuring a current time, wherein
the specifying means includes:
a destination specifying unit for specifying a destination target environment when the current time matches one of the scheduled execution times by referring to the table interpreted by the first interpreting means, wherein the reading means reads the operation state information from the source target environment when the destination specifying unit specifies the destination target environment.

18. A computer-readable recording medium storing a debugging program which is run on a computer connected to a target machine, and emulator machine emulating the target machine, and a simulator simulating the target machine in terms of software, the debugging program allowing the computer to operate as a debugging apparatus, wherein:

a program which is embedded in the target machine, is run in the target machine, the emulating machine, and the simulator, and each of the target machine, the emulator machine, and the simulator includes operation state information which indicates an operation state of the program and inputs and outputs the operation state information in a form unique to each of the target machine, the emulator machine, and the simulator, the computer including:

target environment storing means for storing information of a target environment which is an identification name of any of the target machine, the emulator machine, and the simulator machine, and the simulator in which the program is currently running, and the debugging program allows the computer to execute:

a receiving step for receiving a command input by an operator;

an instruction detecting step for judging whether a certain instruction is included in the command received in the receiving step;

a specifying step for, when it is judged in the instruction detecting step that the certain instruction is included in the command, specifying a target environment specified by the identification name stored in the target environment storing means as a source target environment and for specifying, as a destination target environment, one of the target machine, the emulator machine, and the simulator other than the identification name stored in the target environment storing means;

an operation halting step for halting operation of the program in the source target environment when the source target environment and the destination target environment are specified in the specifying step;

a reading step for reading operation state information from the source target environment;

a converting step for converting the operation state information read in the preceding reading step into the operation state information written in a form unique to the destination target environment; and an operation resuming step for resuming an operation of the program in the destination target environment.

19. A system for debugging a target program in a prototype machine where said prototype machine includes a microprocessor and circuitry and where said target program is run in said microprocessor and is dependent upon said circuitry, said system comprising:

an emulating machine operably connected to said target machine, said emulating machine comprising means for running said target program and emulating machine memory for storing operational state information pertaining to the running of said target program by said emulating machine; and a computing means operably connected to said target machine and said emulating machine, and including a hardware simulator which uses software to simulate a circuitry response in said prototype machine and means for running said target program, and simulator memory for storing operational state information pertaining to the running of said target program; said computing means include an input receiving means for receiving operator input commands, and translating means for translating commands between said emulating machine, said simulator, and said target machine in a language format unique to said emulating machine, said simulator, and said target machine;

whereby a debugging operation can be controlled by an operator by selectively shifting operation of said target program and operational state information between said target machine, said emulator machine, and said simulator.

20. The debugging system of claim 19 wherein a trace function is performed by said emulating machine in said emulating hardware environment.

21. The debugging system of claim 19 wherein a designated interrupt function is performed by said emulating machine in said emulating hardware environment.

22. The debugging system of claim 19 wherein said means for running said target program comprises an in-circuit chip mounted on an evaluation board.

23. The debugging system of claim 19 further comprising comparator means for comparing the output from two simultaneous programs runs from two of said target machine, said emulator machine, and said simulator, and for outputting differences in said program runs.

* * * * *